(12) United States Patent
Langer et al.

(10) Patent No.: US 6,196,753 B1
(45) Date of Patent: *Mar. 6, 2001

(54) FURNITURE SYSTEM IN PARTICULAR A KITCHEN FURNITURE SYSTEM

(75) Inventors: Otto Langer, Neumarkt-St Veit; Johann Wudy, Bodenmais; Thomas Haberl, Freising/Attaching; Robert Heizinger, Neumarkt-St. Veit; Klaus Massanetz, Moosburg; Rene Neumann, Eberspoint, all of (DE)

(73) Assignee: bulthaup GmbH & Co. Küchensysteme, Aich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 09/322,682

(22) Filed: May 28, 1999

Related U.S. Application Data

(63) Continuation of application No. 08/877,943, filed on Jun. 18, 1997, now Pat. No. 6,000,874.

(30) Foreign Application Priority Data

Jun. 20, 1996 (DE) ................................................ 196 24 673
May 21, 1997 (EP) .................................................... 97108219

(51) Int. Cl.[7] ....................................................... F16B 12/00
(52) U.S. Cl. .......................... 403/230; 403/231; 403/192; 312/265.1; 108/158.11
(58) Field of Search ................................... 403/233, 245, 403/246, 262, 191, 192, 230, 231, DIG. 9, 217–218, 170–174; 108/186, 137, 158.11; 248/150; 312/265.1, 265.2, 265.3, 265.4, 111; 211/182

(56) References Cited

U.S. PATENT DOCUMENTS

| | | | | |
|---|---|---|---|---|
| 2,730,421 | * | 1/1956 | Burst et al. | 312/265.4 |
| 4,242,969 | * | 1/1981 | Checkwood et al. | 108/158.11 |
| 6,000,874 | * | 12/1999 | Langer et al. | 403/230 |

* cited by examiner

*Primary Examiner*—Harry C. Kim
(74) *Attorney, Agent, or Firm*—Dilworth & Barrese LLP

(57) ABSTRACT

The invention relates to a furniture system, in particular a kitchen furniture system consisting of a self-supporting basic framework with tubes and/or sections connected to each other by connecting elements. In accordance with the invention the connecting element has a shaped part which is itself formed as a tube and/or substantially closed hollow section on which at least one laterally protruding projection is formed extending over the whole length of the connecting element and that the connecting elements themselves are integrated as vertical components which replace the tubes and/or sections in some parts in the basic framework.

25 Claims, 44 Drawing Sheets

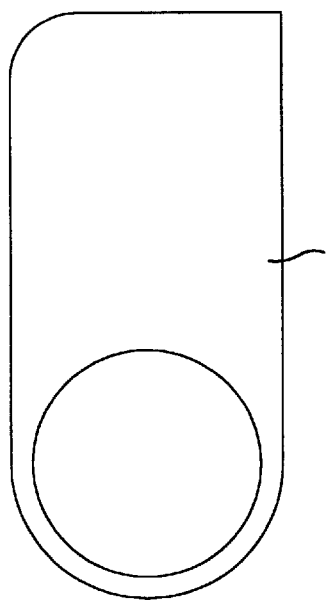
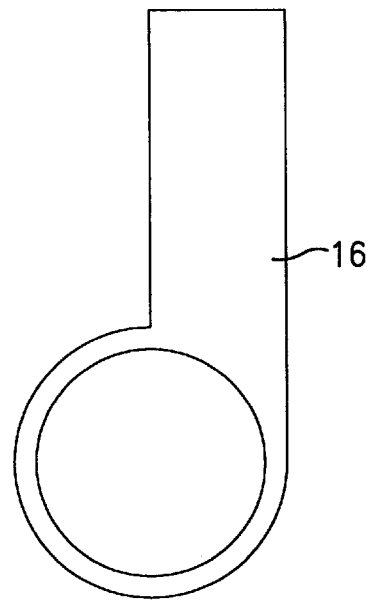
FIG. 15      FIG. 16
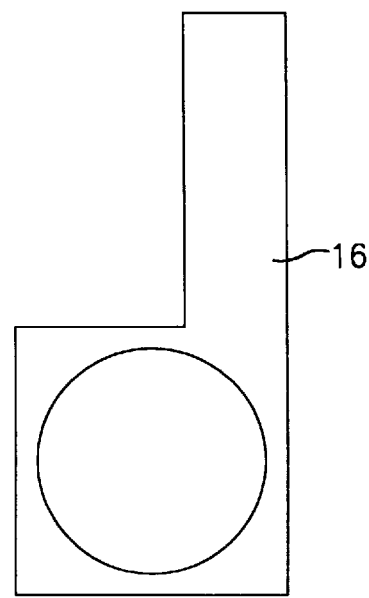
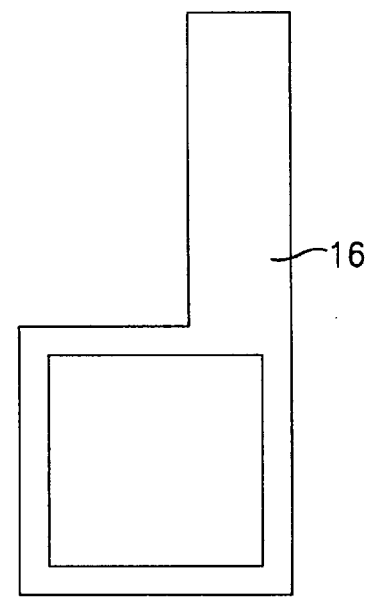
FIG. 17      FIG. 18

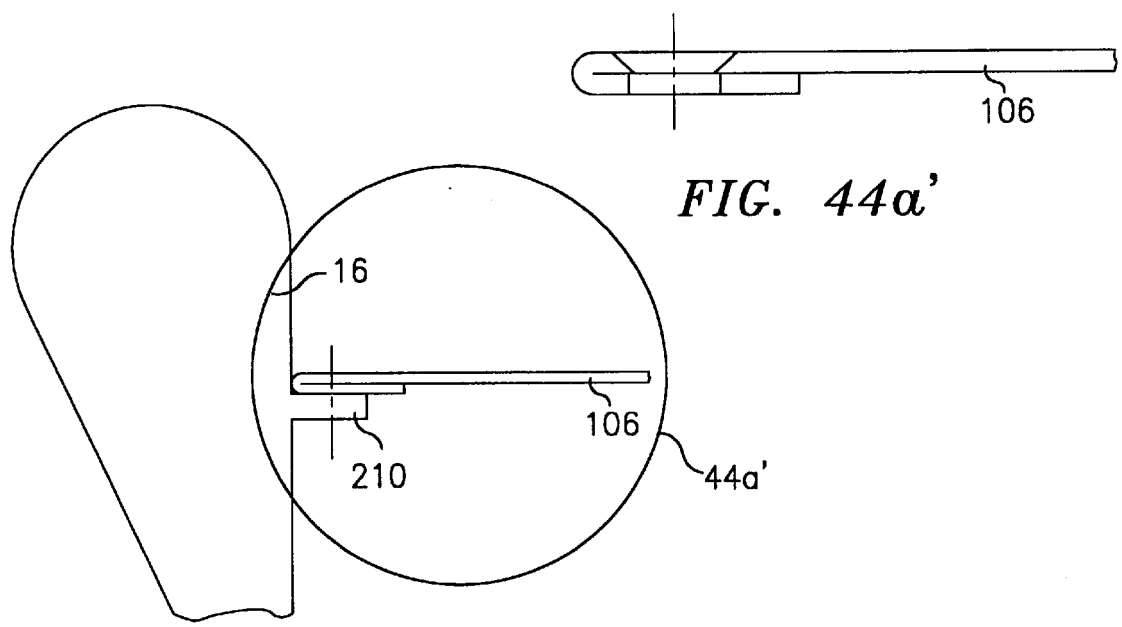
FIG. 44a'
FIG. 44a
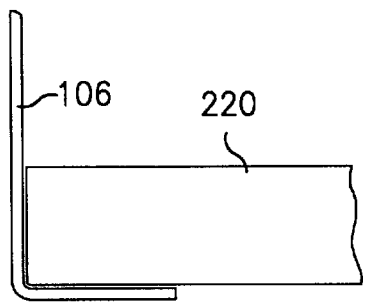
FIG. 44b
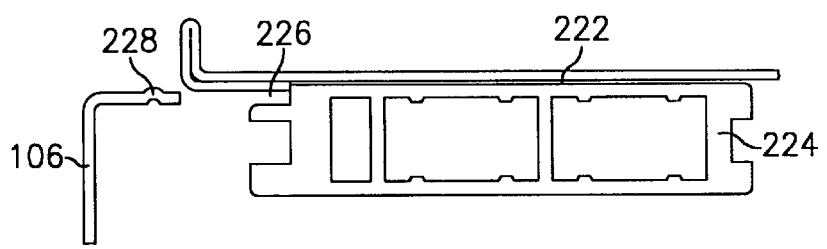
FIG. 44c

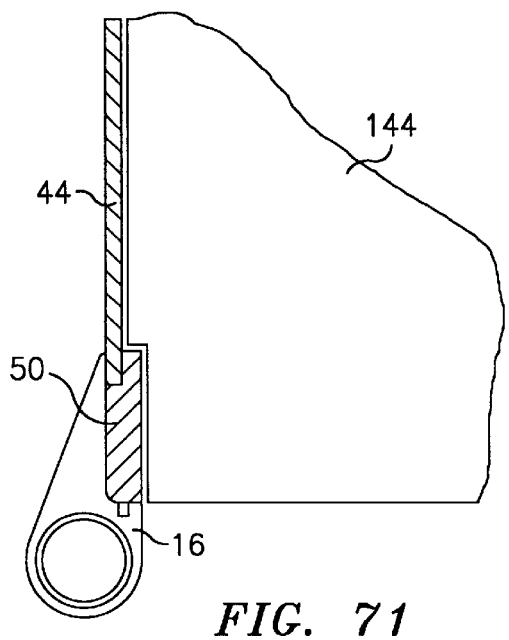
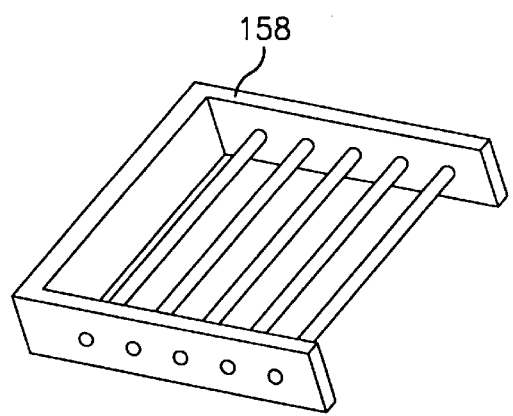
FIG. 71    FIG. 70
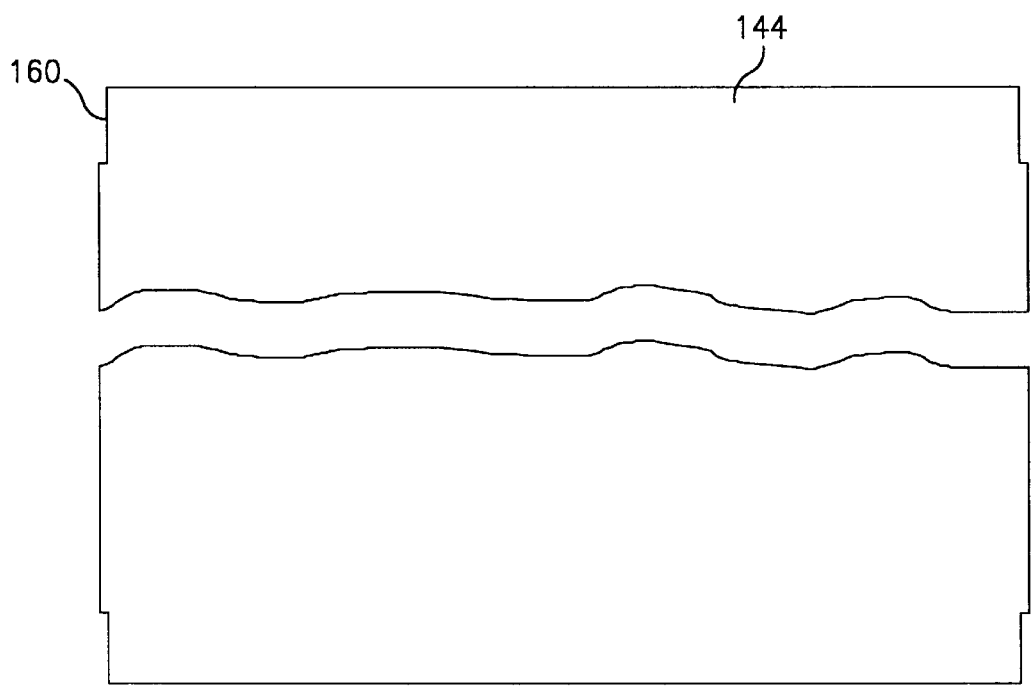
FIG. 72

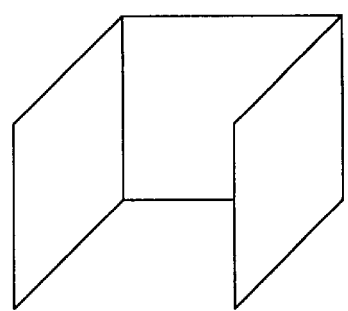
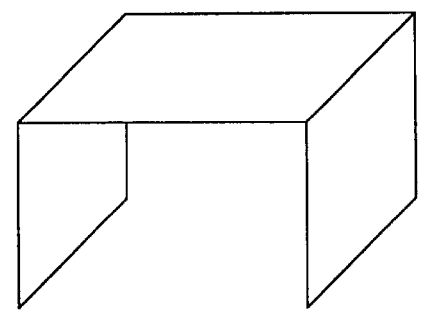
FIG. 73a      FIG. 73b
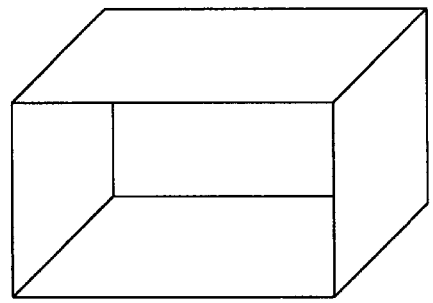
FIG. 73c
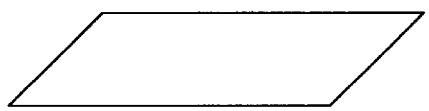
FIG. 74a
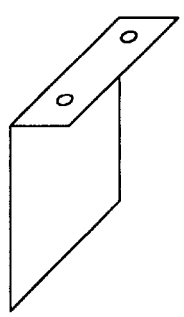
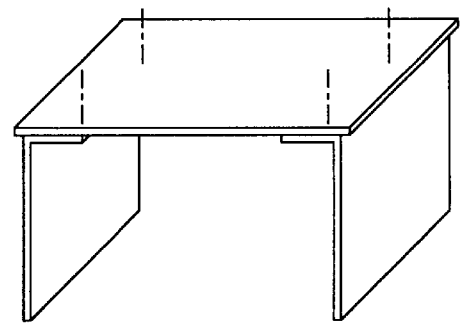
FIG. 74b      FIG. 74c

FURNITURE SYSTEM IN PARTICULAR A KITCHEN FURNITURE SYSTEM

This is a Continuation of Application Ser. No. 08/877,943, filed Jun. 18, 1997, now U.S. Pat. No. 6,000,874.

BACKGROUND OF THE INVENTION

The invention relates to a furniture system, in particular a kitchen furniture system in accordance with a self-supporting base framework with two tubes and/or sections connected to each other by means of connecting elements.

In the field of kitchen furniture, over the past decades fitted kitchens have become the norm. These are kitchen furniture fitments which are adapted to fit the room design of the kitchen. The kitchen furniture fixed together in the unit of a fitted kitchen now possess the disadvantage of a lack of mobility. This affects on the one hand the possibility of any desired repositioning and reorganizing of the kitchen furniture within the kitchen. But even more frequently problems arise with the moving to a different house which as a rule makes it necessary to install a completely new fitted kitchen in the new house.

Even before the introduction of fitted kitchens, it was already known to put together kitchens from individual pieces of furniture such as storage cupboards, cabinets, etc. However, the furniture in these cases was conventional furniture which were frequently not coordinated with one another in their sizes and their appearance.

In the very recent past, there have been made first endeavours to make mobile kitchen elements available. In this connection, the so-called "suitcase kitchen" can be mentioned where the cupboards and functional units such as dishwasher, washing machine, stove are integrated in a type of suitcase housing which can be moved on rollers and which possesses integrated flip-handles to transport the unit.

On the other hand, in the field of shelf and office furniture, a furniture system is already known where a self-supporting basic framework with tubes connected to one another by means of connecting elements is provided, then, depending on the function, shelf boards, side panels, wall panels, flaps, drawers or similar being installed and the wall elements also being statically supporting parts of the furniture. The connection of the tubes forming the basic framework is formed by essentially spherical knot elements which the tubes are screwed into by means of a screw on the end side.

SUMMARY OF THE INVENTION

The object of the invention is to develop a furniture system with a self-supporting basic framework allowing the flexible design of kitchen furniture to the inclusion of all functions and permitting at the same time high mobility and possessing its own and appealing design.

This object is solved in accordance with the invention beginning with a furniture system of the generic type by the connecting elements comprising a shaped part which is, itself, formed as a tube and/or substantially closed hollow section, on which at least one laterally protruding projection is formed extending over the whole length of the connecting element, and the connecting elements, themselves, are integrated as vertical components which replace the tubes and/or sections in some parts in the basic framework. Accordingly, the connecting elements of the basic framework consist in each case of a shaped part itself being designed as a tube and/or a substantially closed hollow section on which at least one laterally protruding projection is formed extending over the whole length of the connecting element. The connecting elements themselves are integrated in the basic framework as vertical construction elements which, over their lengths, replace the tubes and/or sections they connect to one another. In this self-supporting basic framework made up of standardized parts, all functions can be integrated by using the connecting elements formed with the projections. Thus, shelf elements, side panels, doors, flaps, fittings and drawers can be integrated without problems. Thanks to the high support capability, even heavy built-in fitments can be integrated. The design of the connecting elements not only allows an advantageous module component system from technical points of view, but also a significant design effect thanks to the connection of the basic framework formed from a tube and/or a substantially closed hollow section with a connecting projection.

Advantageous embodiments of the invention are shown herein.

Accordingly, the vertical elements of the basic framework can consist of tubes and/or sections extending into the hollow section of the connecting elements. Here, the tubes and/or sections can extend over the whole length of the connecting element so that the connecting element is, so to say, pushed like a sleeve onto the hollow section. Advantageously, the hollow sections, however, do not extend over the whole length in the connecting element, but are pushed in at the ends only to such an extent that a secure fixing is possible in the connecting element, for example by clamping, screwing, etc. In this way, material and weight is substantially saved.

The horizontal tubes and/or sections as well as any inserted plates, frames, etc. of the basic framework can be fixed to the projection of the connecting element.

It is of special design appeal if the connecting element possesses the shape of an asymmetrical droplet in its cross-section. This shape, however, also allows very good functionality as no edges are formed here which, for example, make cleaning the surface more difficult.

The connecting element may possess a round or polygonal hollow section adapted in each case to the shape of the tubes to be connected to one another.

In the connecting element, on one side of the projection a recess can be provided for the flush acceptance of components such as wall elements, floors, frames, tubes or plates.

On the outside, ornamentation can be applied to the connecting element which may be, for example, engraved and/or printed in order to give the furniture an additional design character.

It is especially advantageous if assembly plates are connected to the connecting elements possessing as such standardized boreholes, screw boreholes, recesses and/or grooves serving to accept components and fittings to be assembled. These assembly plates thus contain a series of assembly possibilities which in particular restrict the availability of a variety of shapes of components for the furniture system. The repositioning of the furniture system is also simplified thanks to the multi-functionality of these assembly plates.

In accordance with an alternative embodiment, the connecting element can also be formed of a plurality of parts. Thus, while the connecting element in itself may possess a droplet shape, it can include a clampable screen to be fitted from the outside in order to cover screws of a screw connection to be screwed in from the outside. Here, an assembly-friendly design is provided as a screw capability from the outside is given once the screen is removed.

But the connecting element can also consist of a hollow section with a shaped recess extending over its whole length and a projection which can be connected to this hollow section with a corresponding shaped projection for the form-locking connection of the two parts.

BRIEF DESCRIPTION OF THE DRAWINGS

Further details and advantages of the invention are described in more detail by means of a number of drawings showing embodiments. These show:

FIGS. 8–35, 35a and 35b: Various embodiments of connecting elements of the furniture system in accordance with the invention;

FIGS. 40–44, 44a, 44b and 44c: Perspective views of assembly plates of different shape, partially with attached elements in accordance with different embodiments of the furniture system in accordance with the invention;

FIG. 70: A grating bottom for use in the furniture system in accordance with the invention;

FIGS. 71, 71a, 72: A top view, partially cut, of a bottom panel with pull-out safety catch for use in the furniture system and its fitted situation;

FIGS. 73a, 73b, 73c, 74a, 74b, 74c: Various bottom/side part combinations for use in the furniture system in accordance with the invention;

DESCRIPTION OF THE PREFERRED EMBODIMENTS

Figure 1:
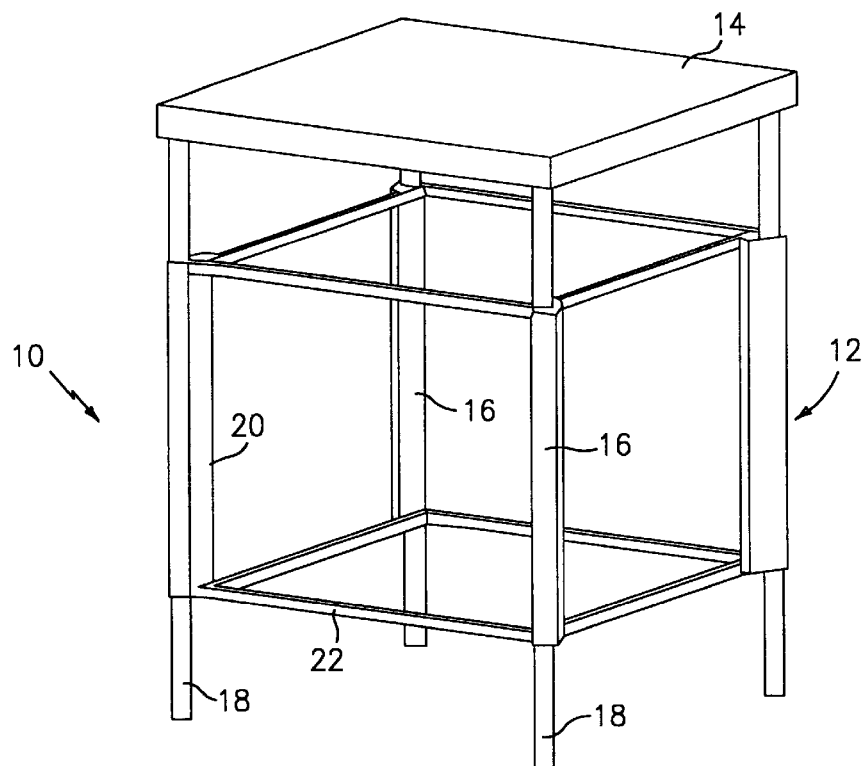
FIGS. 1, 2, 2a and 3: Perspective views of different embodiments of the basic framework in accordance with one embodiment of the present invention.
Figure 2:
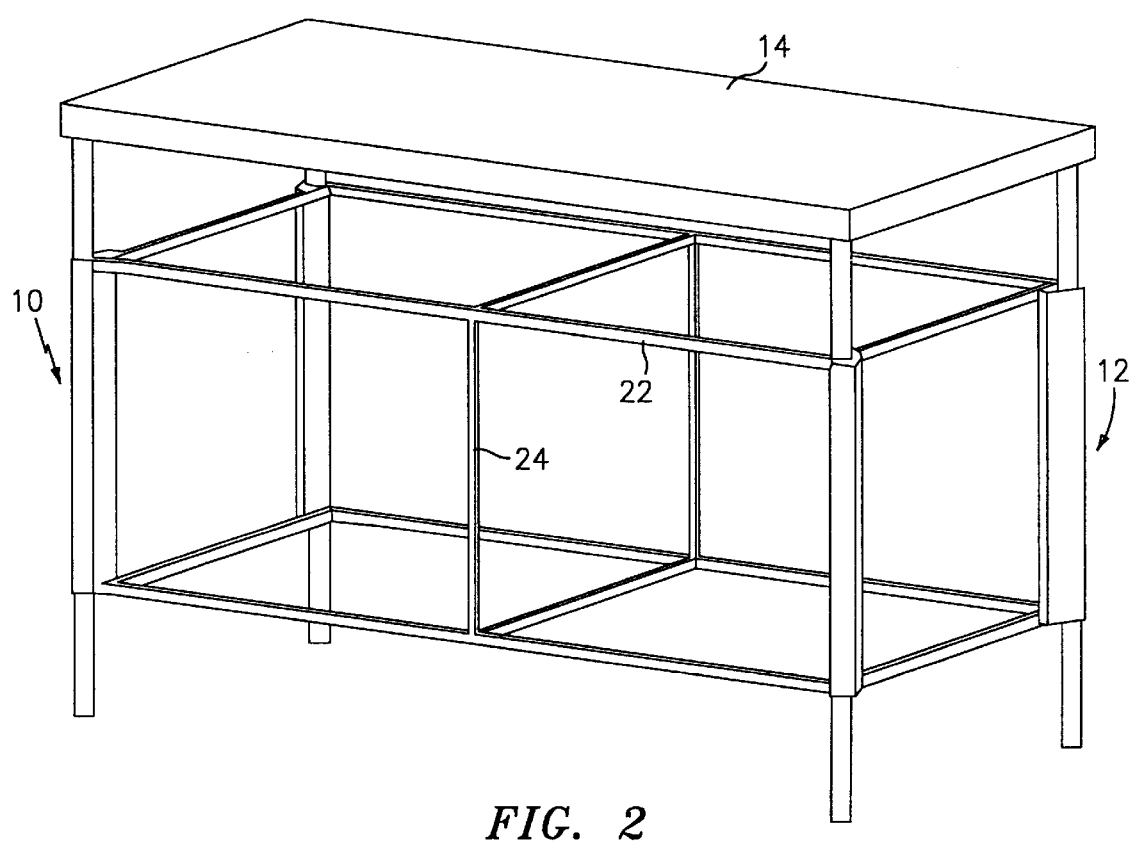
Figure 3:
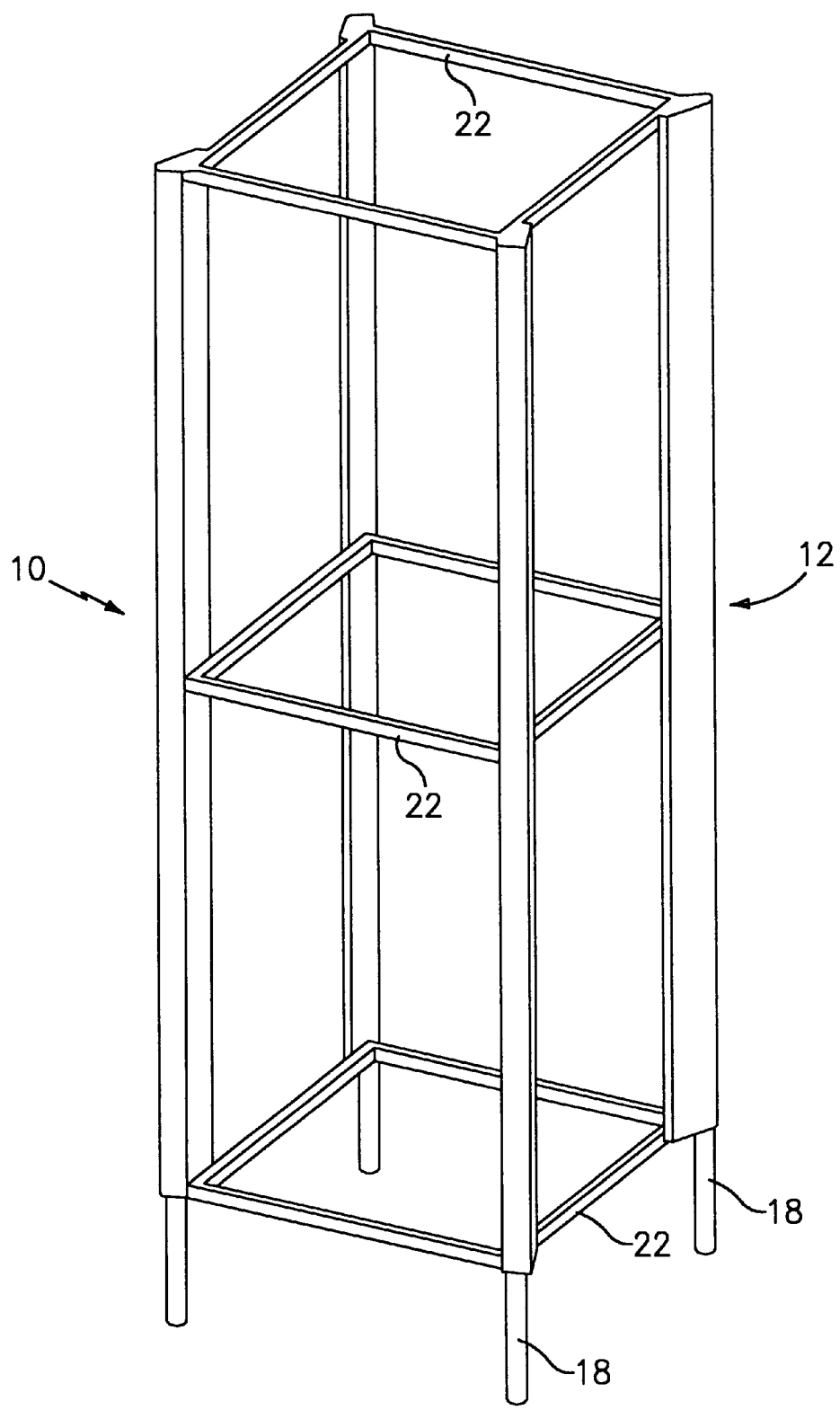

FIGS. 1 to 3 show by means of different examples the structure of a basic framework 12 for a piece of kitchen furniture 10. In FIGS. 1 and 2 a workplate 14 is also placed on the basic framework 12. The basic framework 12 consists in all embodiments of connecting elements 16 which have a vertical orientation and in which the equally vertical tubes 18 are inserted. The connecting elements 16 consist of a shaped part which is formed as a tube itself and on which a laterally protruding projection 20 is formed which extends over the whole length of the connecting element 16. On this projection 20 are fixed the horizontal struts, formed here as square tubes 22. The basic framework of the furniture system in accordance with the invention is therefore produced by a tube system which is connected together by connecting elements 16. The connecting elements 16 and also the usual tubes 18, 22, consist preferably of metal, for example aluminium or stainless steel, but also of wood or plastic. The basic framework as shown in FIGS. 1 to 3 possesses in each case four legs, in each case rollers being able to be provided on the feet. Through the horizontal course of the tubes 22, two bottom levels are formed. Instead of the tubes 18, 20, here, in a manner not shown, for example a plate of metal or wood can be connected to the connecting elements.

Figure 2A:
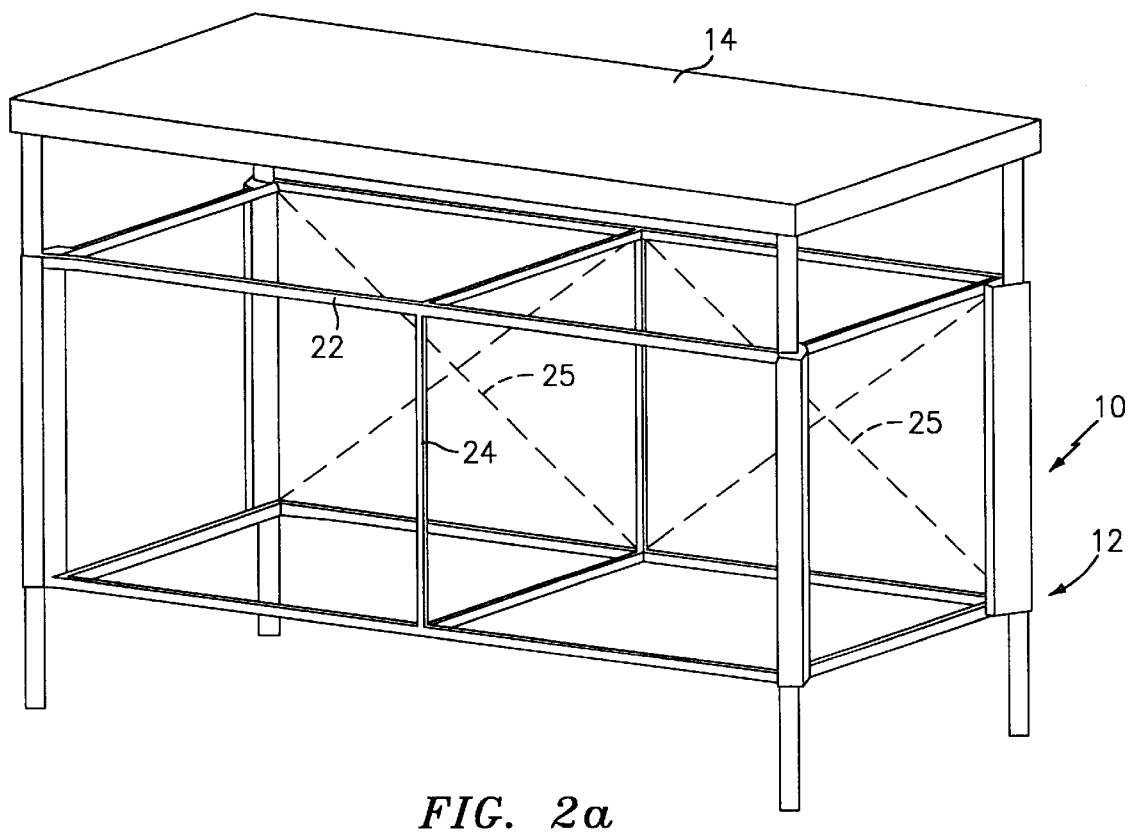

While FIG. 1 shows a single block in which a functional element such as an appliance is later formed, the embodiment of FIG. 2 is formed as a dual block. Here, two appliances can be fitted next to each other later. The horizontal square tubes 22 are here connected to one another by a central vertical support frame 24 also consisting of square tubes. As shown in FIG. 2a, the frame can be reinforced in the rear panel area with static aids such as ropes or rods 25 to prevent bending or similar. The embodiment of FIG. 3 shows a high single block in which two function compartments are positioned on top of each other. Here, in addition to the lower and upper support levels formed by the horizontally running square tubes 22, another middle support level is formed by corresponding square tubes 22, these being able to be fixed to the connecting elements 16 in a freely adjustable manner in their height.

In the basic frameworks 12 shown here, the tubes 18 formed here as tubes with a circular cross-section, are only inserted into the relevant connecting element 16 to such an extent as is ensured by corresponding connections or constructional safety elements for the required stability. What is important here is that the framework is self-supporting and self-reinforcing and that stability is not achieved through the side parts for the kitchen furniture usually used here. In this way, no consideration at all of the design of the side elements need be taken. Thus, it is possible to fit any functional units in the self-supporting and self-reinforcing basic framework 12.

Figure 4:
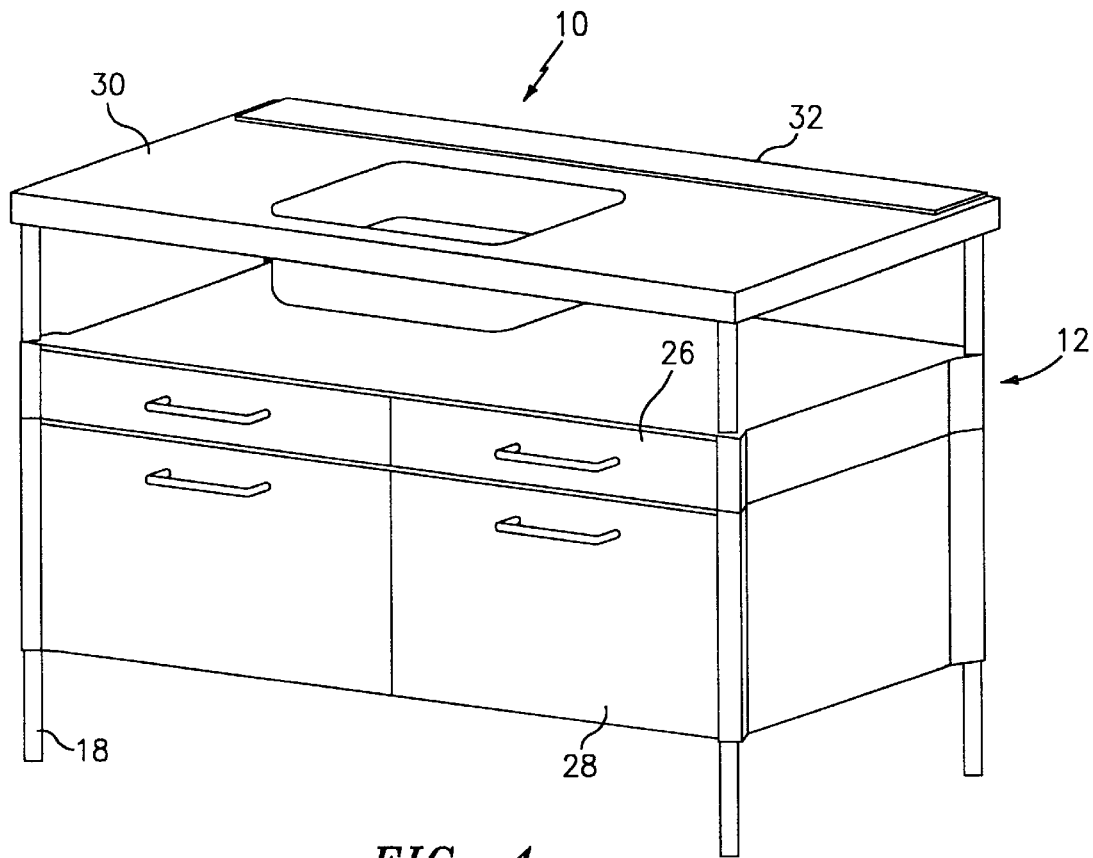
FIGS. 4, 4a, 5–7 and 7a: Various basic modules in perspective views.
Figure 4A:
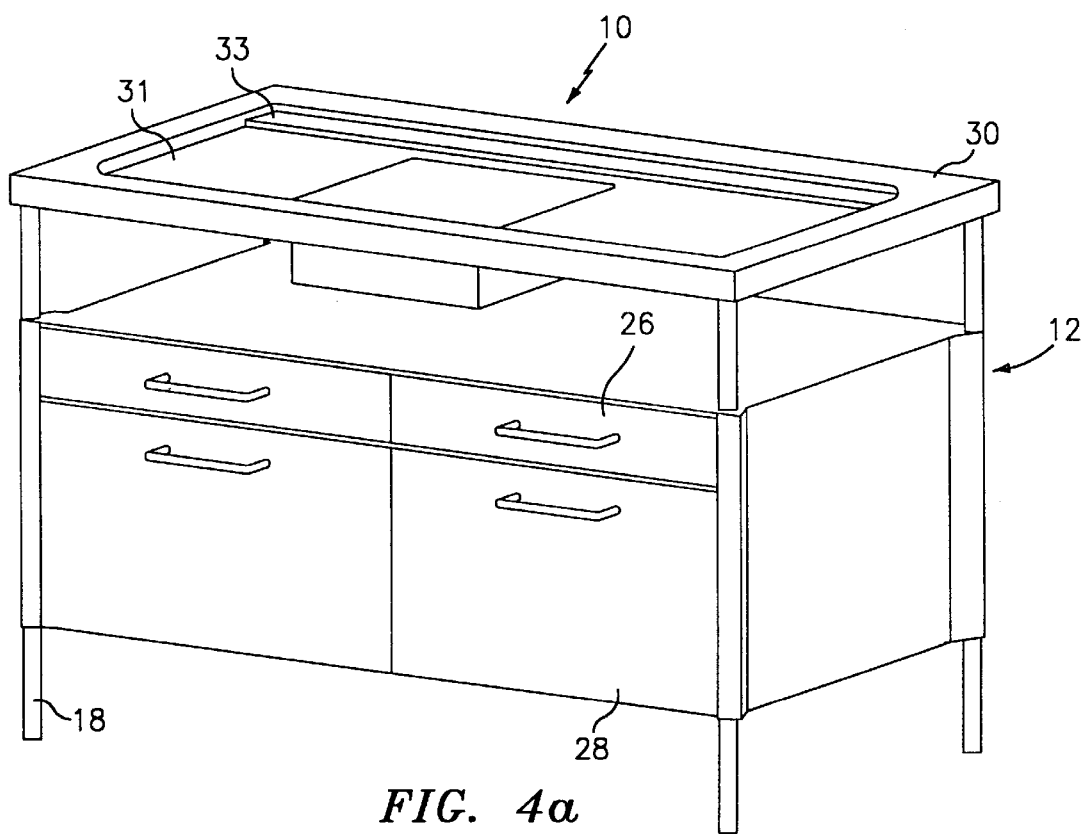
Figure 5:
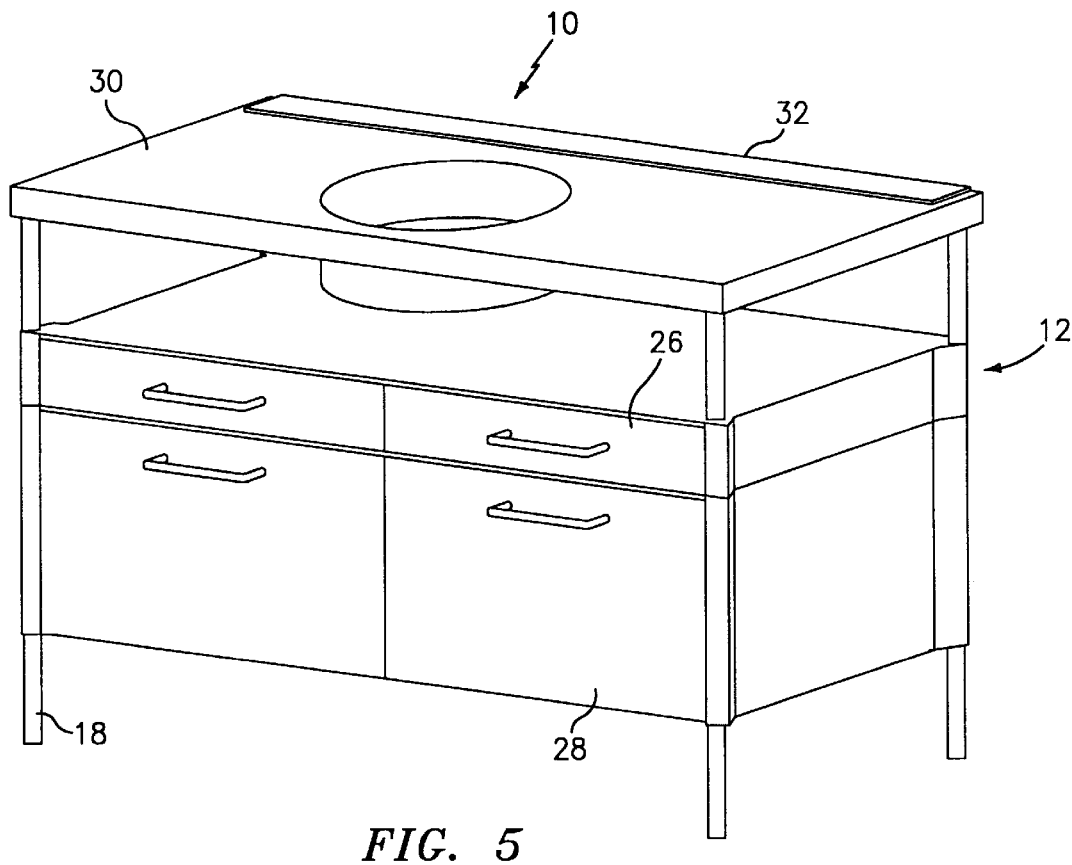

FIGS. 4 to 7 here give some examples for correspondingly realized functional units. Here, in the kitchen furniture of FIGS. 4 and 5, a dual block is shown in each case which essentially contains a basic framework 12 in accordance with the prior embodiment of FIG. 2. Here, however, in each case another additional horizontal level is included to fit drawers 26. In the lower area, larger drawers 28 are positioned. The support plate 14 in each case is a wet unit 30 with integrated sink, the shape of the sink differing in the embodiments of FIGS. 4 and 5. In the back area of the wet unit 30, strips 32 are laid in each case which form a stop edge on the wet unit 30 and thus prevent objects or liquids from falling behind the wet unit. FIG. 4a shows a wet unit 30 where the integrated sink is positioned in a wide-area hollow 31 possessing a step-shaped shoulder 33 in the rear section.

Figure 6:
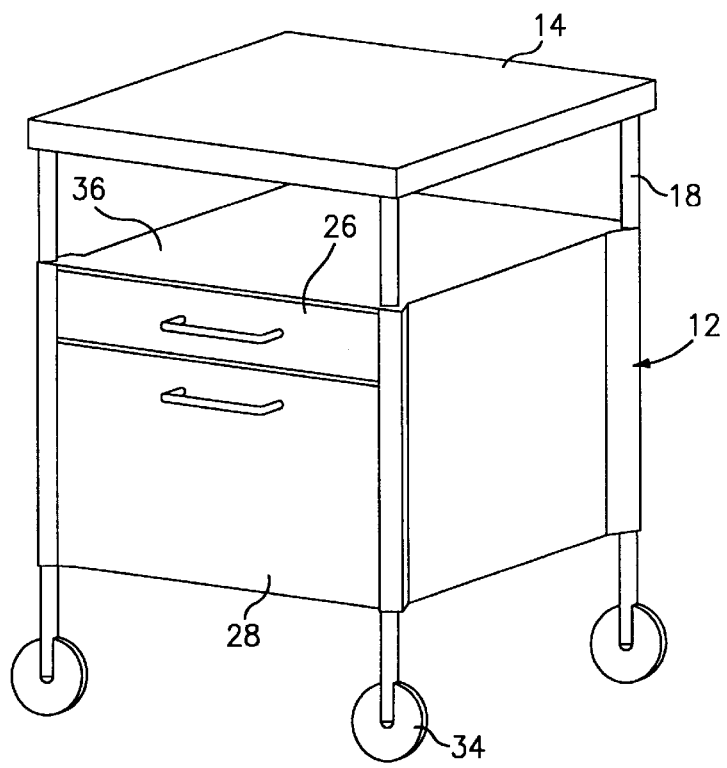

FIG. 6 shows an example for a preparatory unit where a drawer section 28 and a narrower drawer section 26 is formed in the frame 12. A holding level 36 is formed above the narrower drawer section 26. A workplate 14 rests on the basic framework 12. The preparatory unit here is supported in a travelling fashion on rollers 34.

Figure 7:
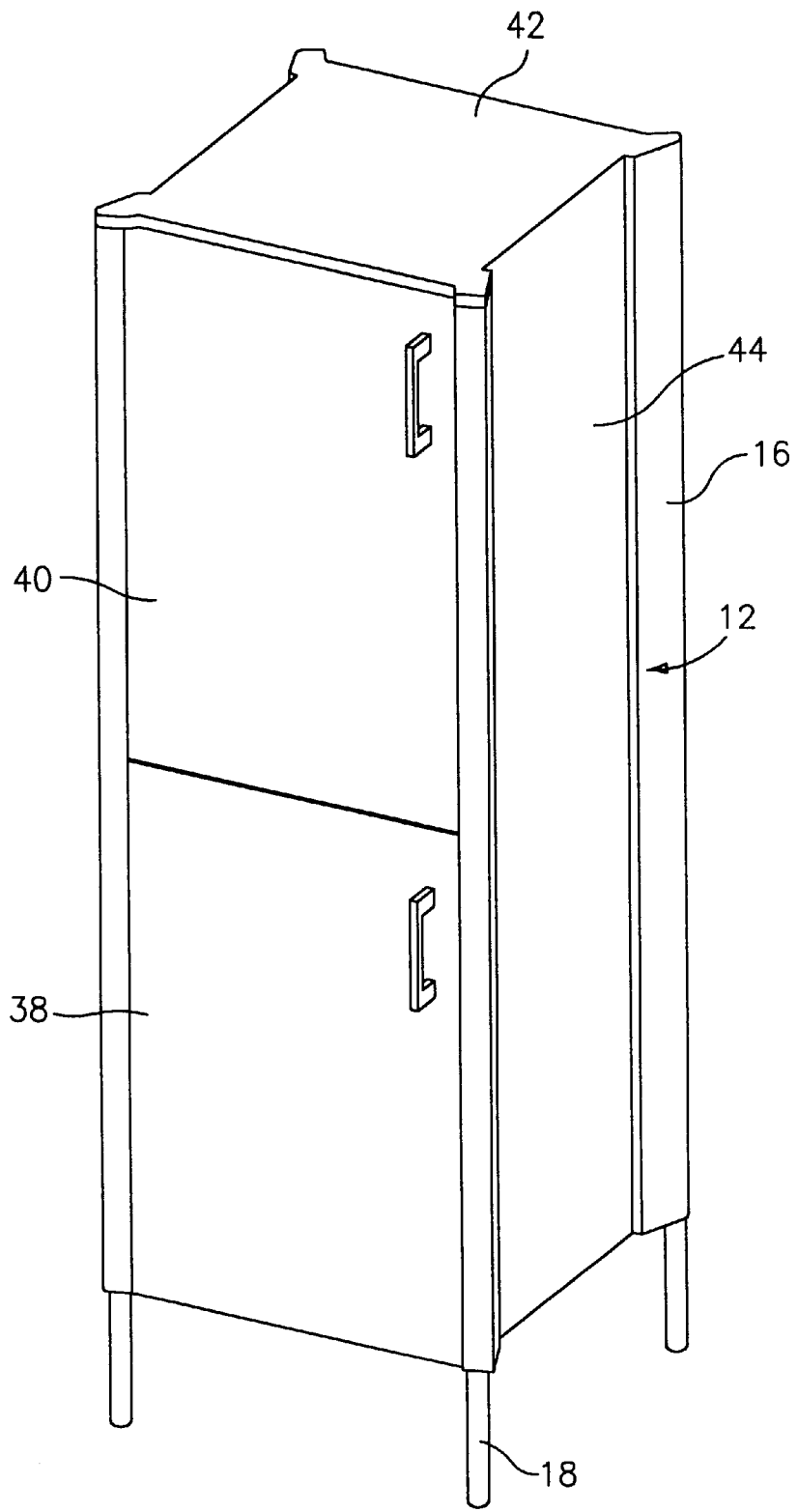

In FIG. 7 a "high" single block with, in this embodiment, two appliances fitted on top of each other is formed in the basic framework 12 which single block possesses two door elements 38 and 40 positioned on top of each other. In the upper area, a refrigerator is integrated in the embodiment shown here through the door element 40. A cover plate 42 lies on the top and side walls 44 are connected to the connecting elements 16 at the sides.

Figure 7A:
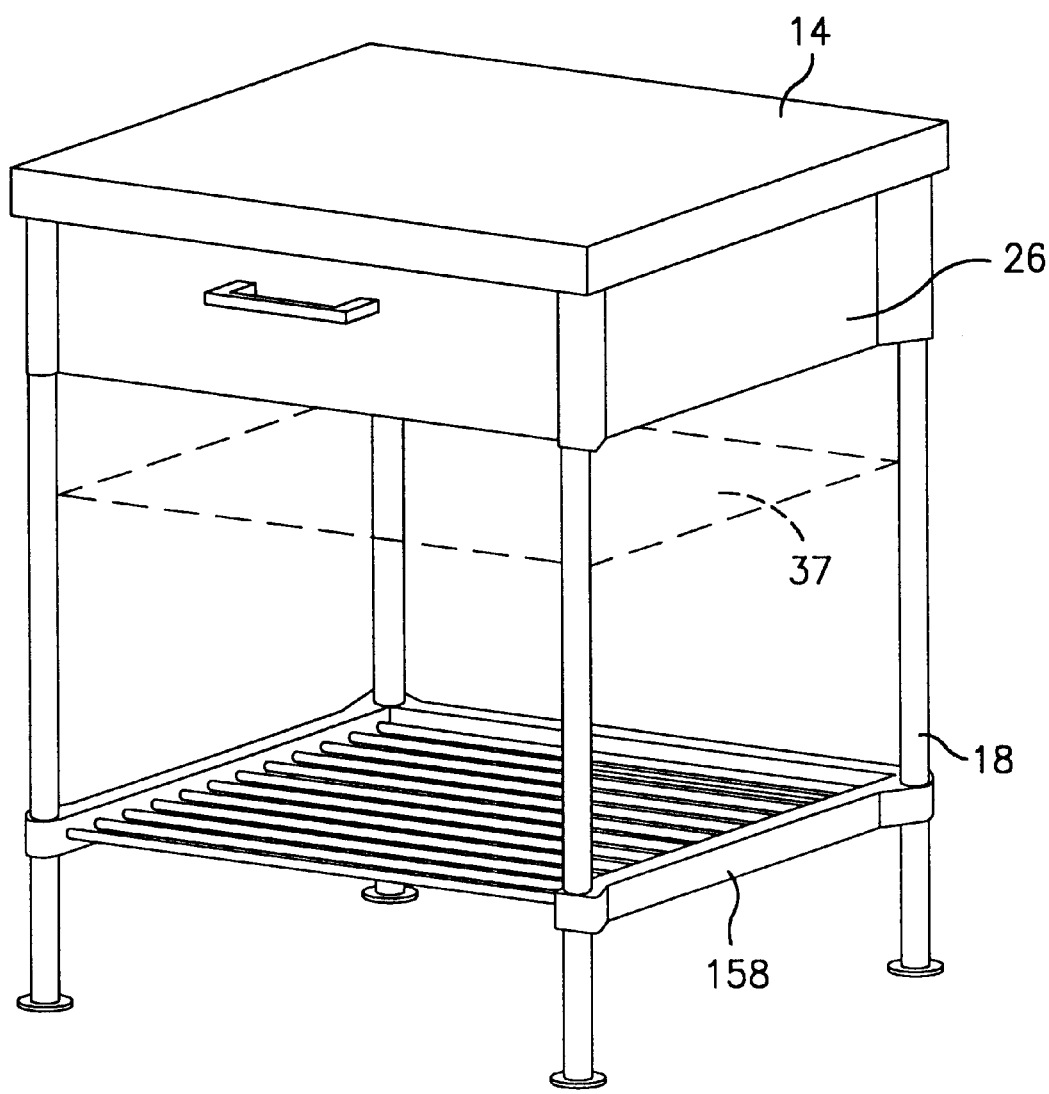

FIG. 7*a* shows a further embodiment of the invention, here as a "low" single block. Here, a narrow pull-out means 26 is positioned below the plate 14. In the lower are, the single block here has an open design, the lower level being defined by an inserted grating 158. The dotted line denotes a plate which can be installed as an additional intermediate shelf 37.

Figure 8:
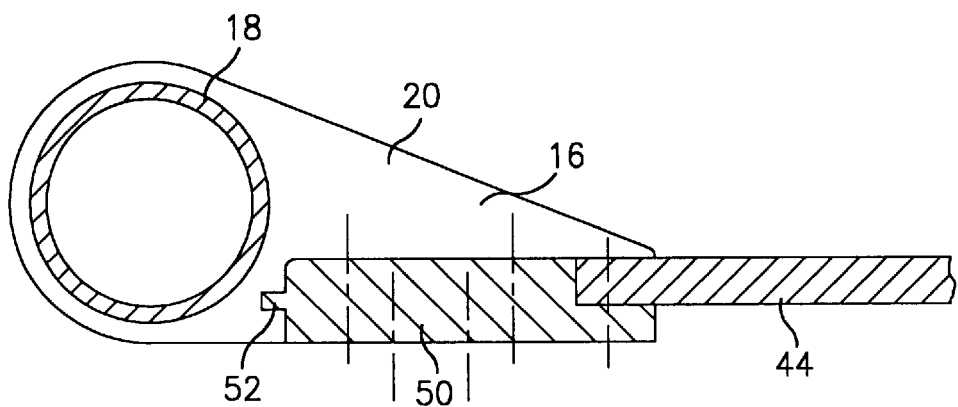
Figure 11:
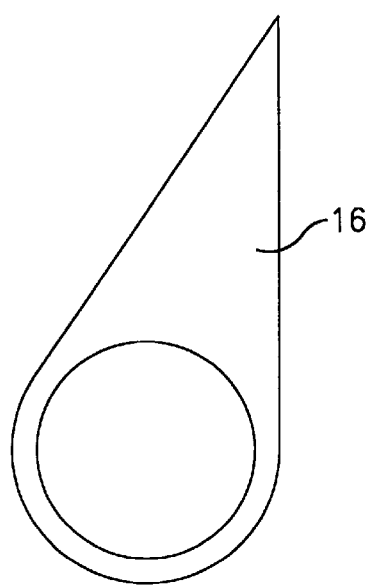
Figure 12:
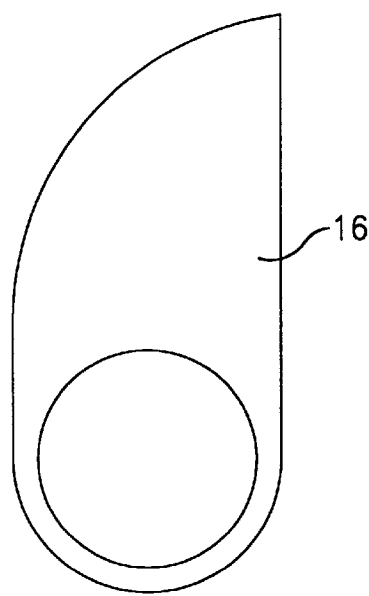
Figure 13:
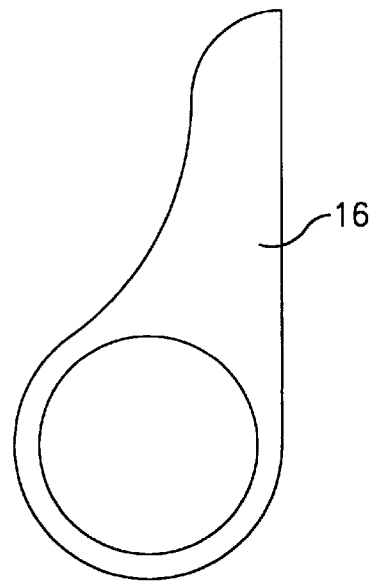
Figure 14:
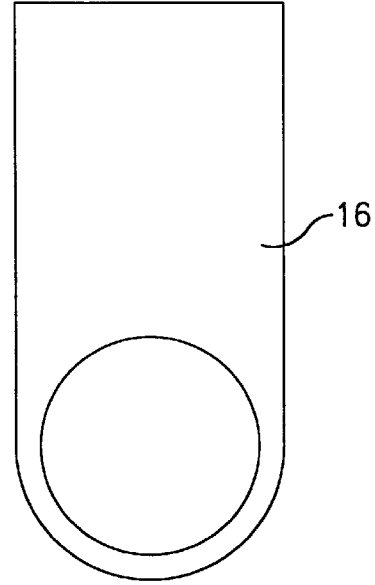
Figure 19:
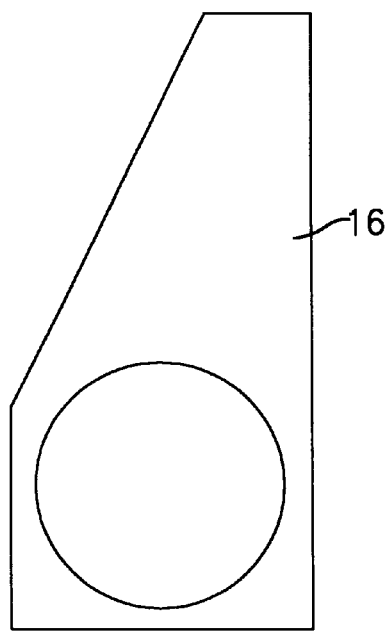
Figure 20:
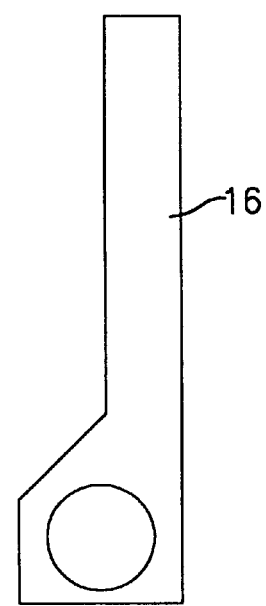
Figure 21:
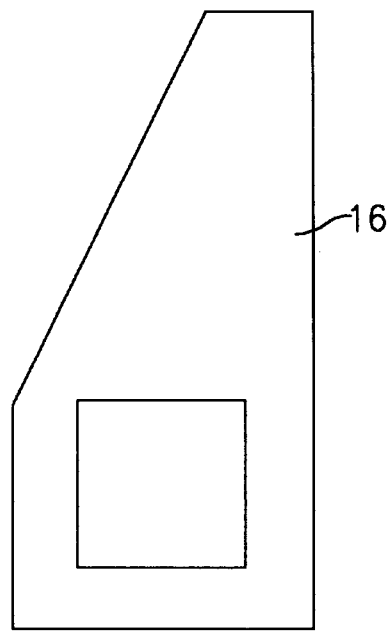
Figure 22:
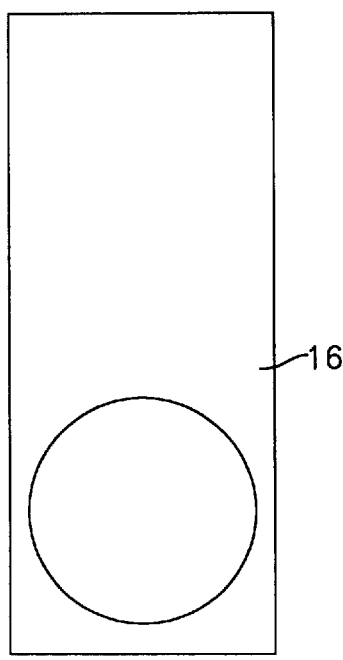

FIG. 8 shows a connecting element 16 in section. It consists of a tubular hollow section and a flag-like projection 20, the total shape of the cross-section corresponding to an asymmetrical droplet shape such as is also shown in FIG. 11. In the embodiment shown here, the connecting element is made, for example, as an aluminium section. It can also comprise other materials such as iron, plastic, etc. In the section level shown here, a tube 18 is shown in the inside of the connecting element 16 which is connected to the connecting element 16 in a non-twist manner. In the embodiment of the connecting element 16 shown here, a recess is provided on the side of the connecting element aligned to the inside of the piece of furniture. In this recess, an assembly plate 50 is screwed in which is additionally integrated in a corresponding groove of the connecting element via a nose-like projection 52. Depending on the requirements, the assembly plate possesses boreholes, screw boreholes and a further groove to accept a side wall 44 which can be screwed in accordingly. The more exact construction and the function of the assembly plate 50 is described more precisely below. In the embodiment in accordance with FIG. 8, a side wall 44 is fitted between the recess of the assembly plate 50 and the projection 20 and connected with a screw connection not shown in detail here.

In the embodiment in accordance with FIG. 8 an alternative embodiment of the connecting element is shown in which only a comparatively small recess exists to directly accept a side element 44. In this embodiment, no assembly plate is provided.

Figure 9:
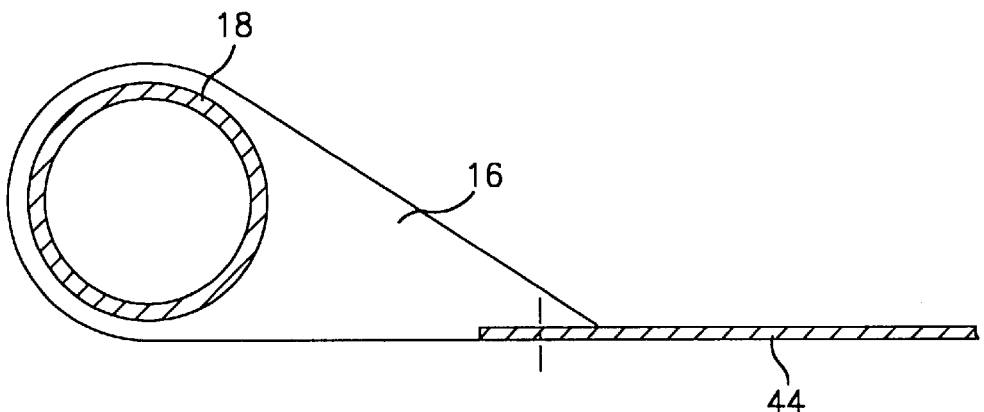
Figure 10:
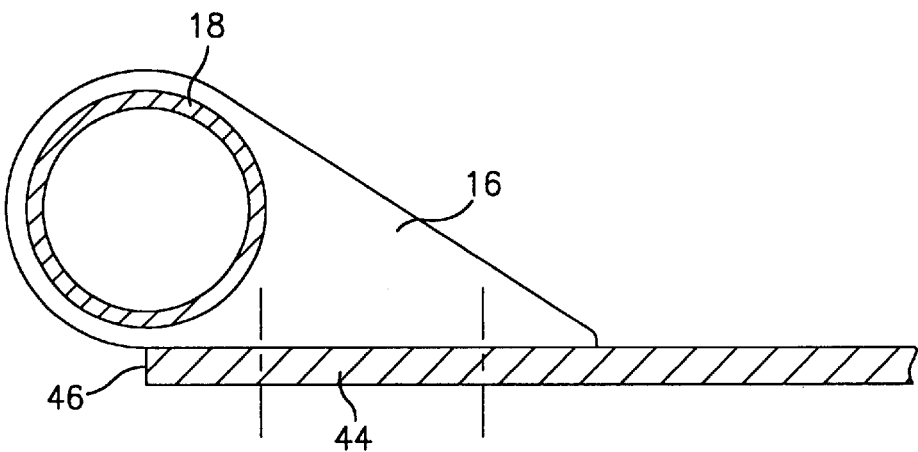

A further alternative embodiment of the connecting element is shown in FIG. 10. Here, however, the connecting element 16 does not possess any recess so that the side element 44 is screwed to the connecting element 16 on the outside. In this way, a shoulder 46 is created. In contrast to the embodiments in accordance with FIGS. 8 and 9, the side element 44 is therefore not formed flush with the connecting element 16. The shoulder 46 simultaneously serves as a door stop for a door.

Figure 23:
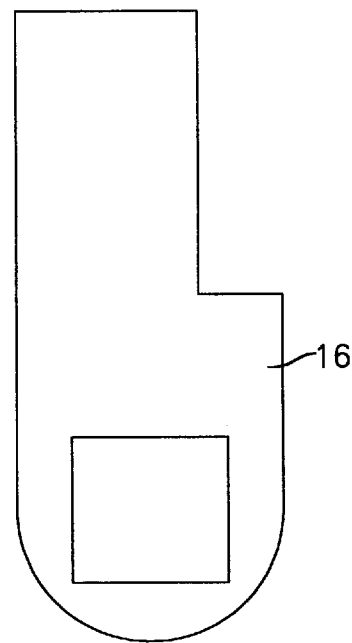
Figure 24:
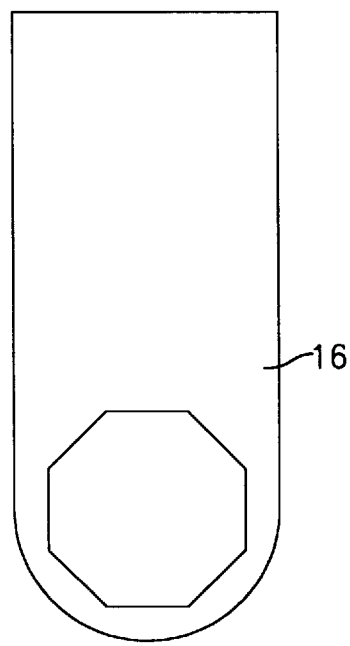
Figure 25:
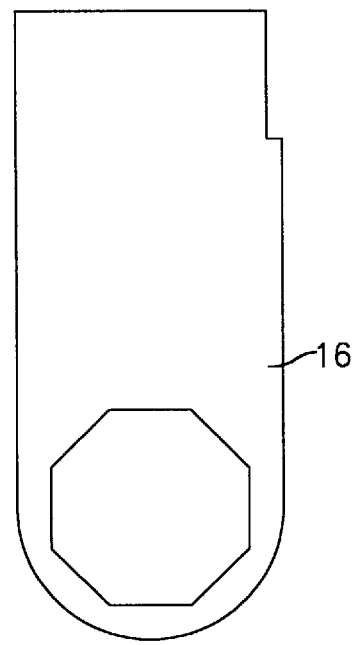
Figure 31:
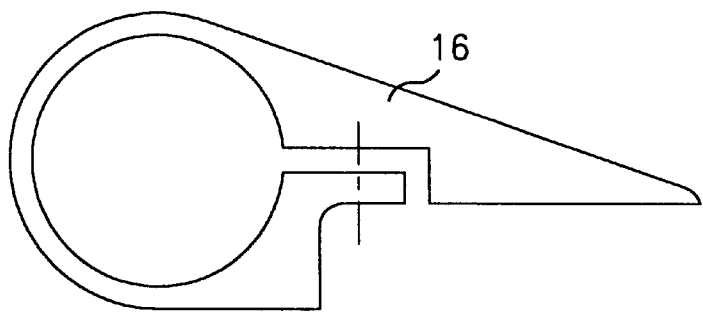

In the embodiments in accordance with FIGS. 1 to 10 and in the further embodiments from FIG. 31 onwards, connecting elements 16 with asymmetrical droplet shapes in cross-section are assumed as are shown in FIG. 11. FIGS. 12 to 25, however, show shape versions of the connecting elements which share the common feature that they consist of a tube and/or a substantially closed hollow section and a projection. The shape is, however, basically different. Thus, the hollow section can possess, as in FIGS. 11 to 17, 19, 20 and 22, a contour which is circular in cross-section inside. This inside contour can, however, also be polygonal. In FIGS. 18 and 23 a quadrangular inside contour is shown in each case, while in FIGS. 24 and 25 an octagonal inside contour is shown. With the polygonal inside contours the tubes 18 not shown in any detail here of the basic framework 12 are naturally also of a polygonal design and adapted in shape.

Specifically the formation of polygons simplifies the adjustment and fixing of a certain bracket for the next connected side. In the tube geometries shown in FIGS. 11 to 25, recesses are shown only in part in which either a side wall 44 can be accepted directly or an assembly plate 50. The position and design of these recesses is, however, not limited to the embodiments shown here, but can be applied to the other embodiments, too.

Figure 26:
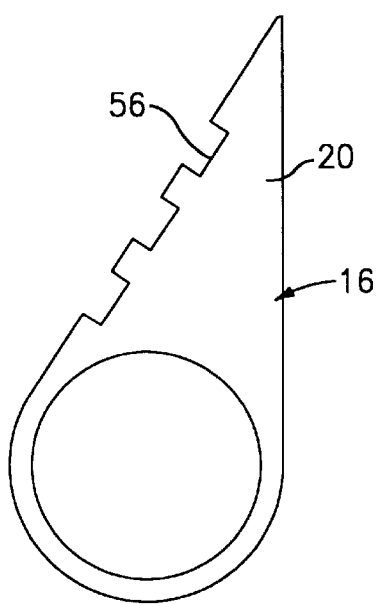
Figure 27:
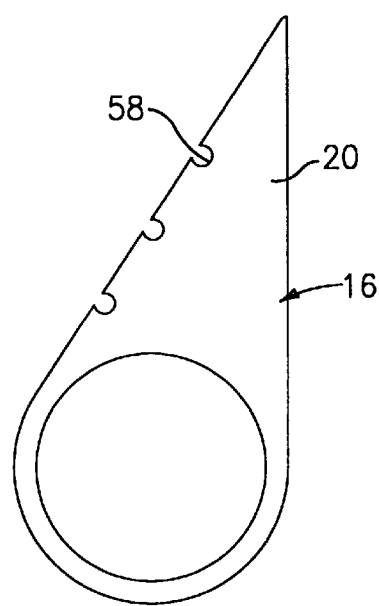
Figure 28:
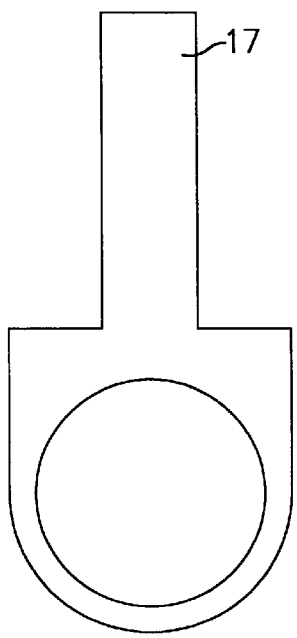

In FIGS. 26 and 27 connecting elements 16 are shown in each case which correspond in their basic shape to that in accordance with FIG. 11, but ornamental fluting 56 (in FIG. 26) or 58 (in FIG. 27) are provided on the surface of the projection 20 lying on the outside pointing away from the piece of furniture. In this way, the section view side is given a correspondingly more attractive design. In FIG. 28 a section 17 is shown which is derived from the shape of the section 16 in accordance with FIG. 14 by the provision of two recesses. This connecting element 17 forms a central part with which, for example, a center post of a piece of kitchen furniture or of a basic module can be realized. Further elements (such as basic modules) can also be fitted using the connecting element 17. In the corresponding recesses, assembly plates 50 not shown in any detail here can be inserted, for example, in each case with which horizontal tubular connections, wall parts, etc. can then be fitted.

Figure 29:
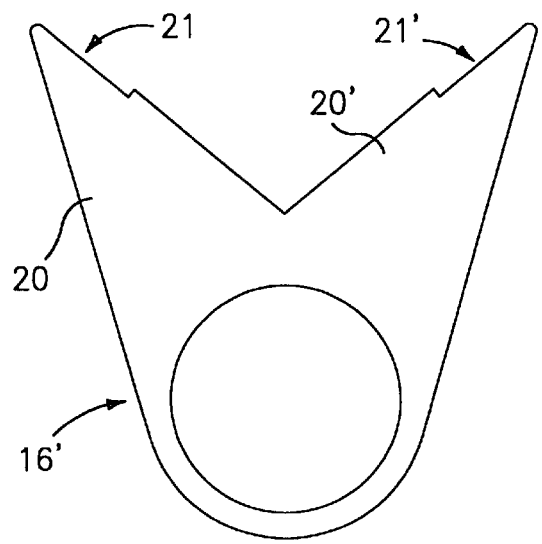
Figure 30:
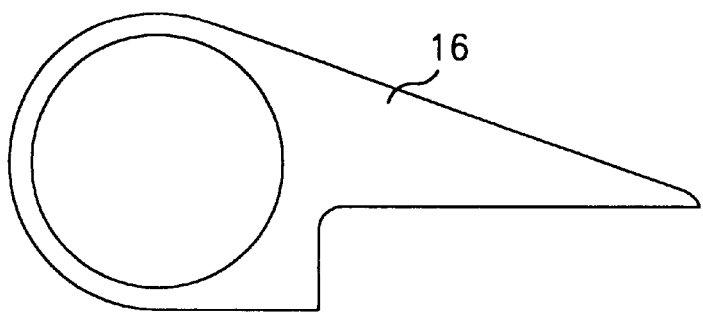

In FIG. 29 a connecting element 16' is shown where two projections 20 and 20' are shaped onto it at right angles to each other. This connecting element can serve as a corner connection in the rear basic framework area. In corresponding recesses 21 or 21', a rear wall and a side wall, for example, can then be mounted.

FIGS. 30 to 34 show various embodiments of connecting elements 16 which differ in the manner of fixing of the tube not shown in any detail here. In the embodiment in accordance with FIG. 30, the tube 18 is connected to the connecting element 16 by a fit, by gluing or by any other releasable or non-releasable connection. In FIG. 31 a connecting element is shown with which the hollow section of the connecting element is formed as a tube clamp so that here a clamping of the tube or wheel holder 18 is performed by means of a corresponding clamp screw connection.

Figure 32:
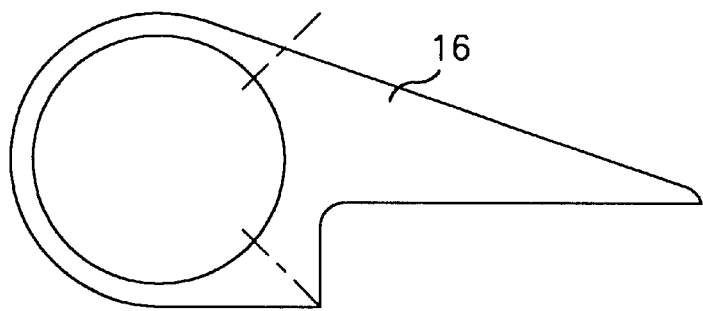

In FIG. 32 two clamping screws are indicated by a broken line in the connecting element 16 via which screws a correspondingly inserted tube 18 can also be clamped.

Figure 34:
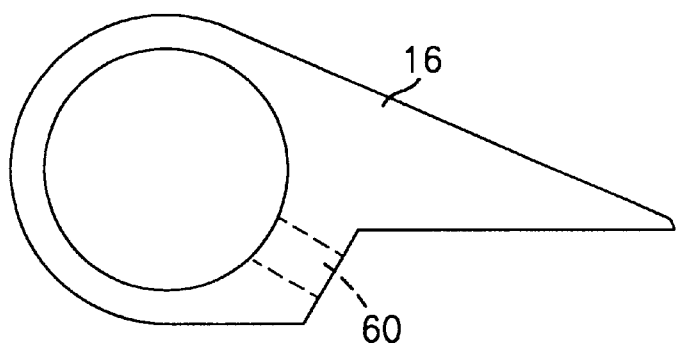
Figure 33:
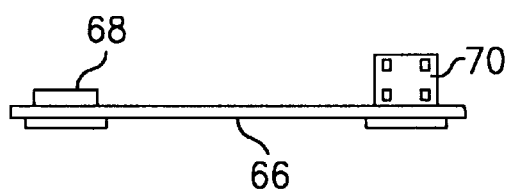
Figure 33A:
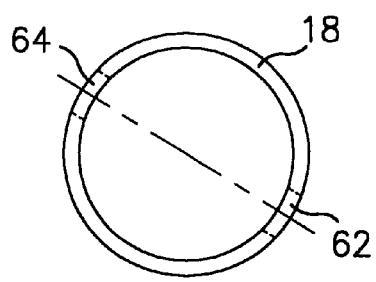

In FIGS. 33 and 34, an alternative fitting of the pipe 18, not shown in detail here, in the connecting element 16 is shown. Here, a corresponding breakthrough 60 is provided in the connecting element 16. The pipe 18 to be fitted which is shown in FIG. 33*a* also possesses breakthroughs 62 and 64 at two positions diametrically opposite one another. A leaf spring 66, which is shown in FIG. 33, can be pushed through the breakthroughs 60 of the connecting element 16 and the breakthroughs 62 and 64 of the tube 18 to fix the tube 18. To fix the leaf spring, differently high protrusions 68 and 70 are provided which comprise, for example, nuts which have been welded on, the protrusion 68 being less high than the protrusion 70. The protrusion 68 can be pushed through the comparatively higher breakthrough 62 of the tube 18. The protrusion 70 fits in the recess 60 of the connecting element 16. The length of the leaf spring 66 is now dimensioned in such a way that in the assembled position it comes to lie with its tongue positioned in front of the protrusion 68 within the recess 64 of the tube 18, while the protrusion 70 comes to lie in the recess 60 of the connecting element 16. In this way, the tube is secured axially and radially in the connecting element 16. The protrusion 70 is adapted to the breakthrough 60 so that here a clamping set is realized.

Figure 35:
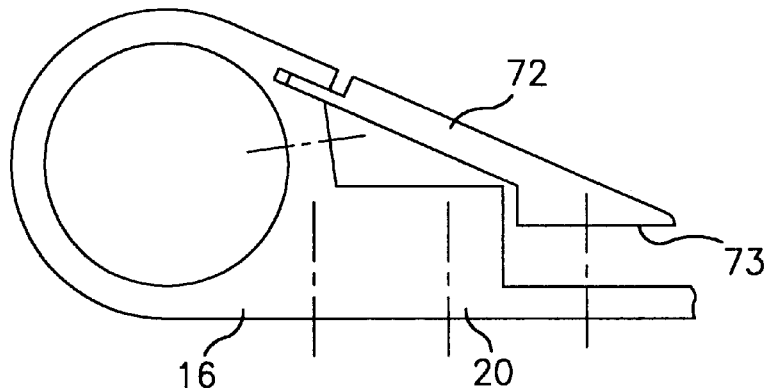

In FIG. 35 a further alternative embodiment of the connecting element 16 is shown. Here, the connecting element 16 possesses screw holes which allow screwing from the outside of the furniture. After screwing from the outside, a screen 72 can be fitted over the area of the screw connections and fixed in place by a spring groove connection or a snap-click connection. The projection 20 of the connection element 16 has a recess in which a side wall not shown in detail here can be accepted. This is supported by a corresponding support surface 73 and screwed in place according to the broken line. Due to the different formation of the screen 72 and the support surface 73, different thicknesses of the side wall can be compensated for here by replacing the screen 72.

Figure 35A:
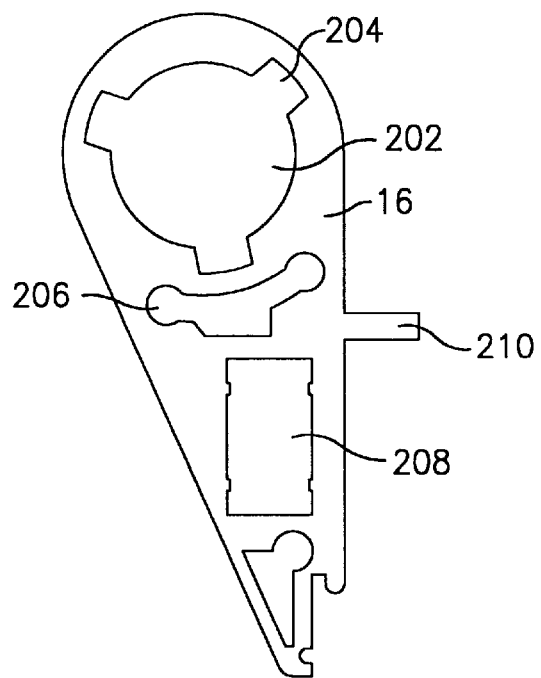
Figure 35B:
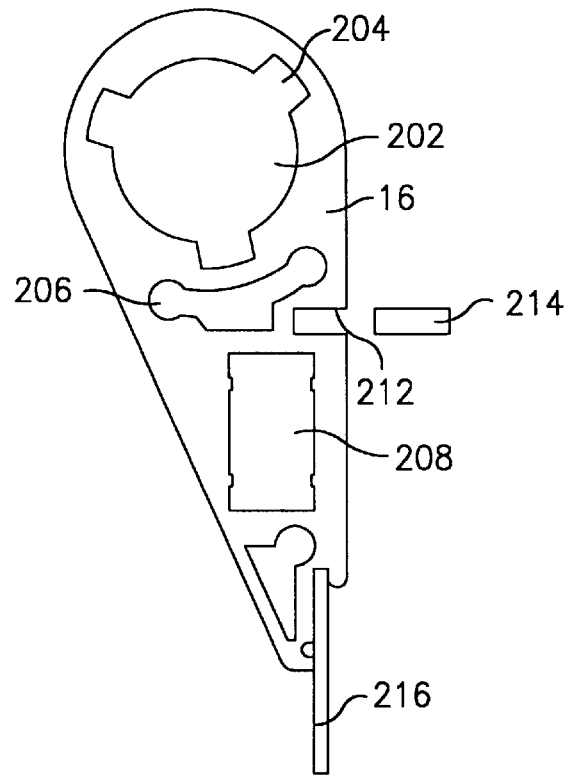

In FIGS. 35a and 35b further embodiments of the connecting element 16 are shown. These two connecting elements possess pipe mounts 202 in each case. On these pipe mounts three grooves 204 are recessed in each case spread uniformly over the circumference. Both connecting elements 16 also possess a corresponding borehole 206 which serves to mount covering caps not shown in detail here.

In addition, both embodiments of the connecting elements 16 comprise hollow chambers 208 to accept corner connectors (cf embodiment in accordance with FIG. 60a) which serve to fix bottom panels. In the embodiment in accordance with FIG. 35a, a protrusion 210 is shaped in one piece on the connecting element 16 which protrusion serves to mount the rear wall.

In the embodiment in accordance with FIG. 35b of the connecting element 16, a groove 212 is recessed in which a front stop 214 can be inserted. In the embodiment in accordance with FIG. 35b a side panel 216 is inserted in a corresponding mount.

Figure 36:
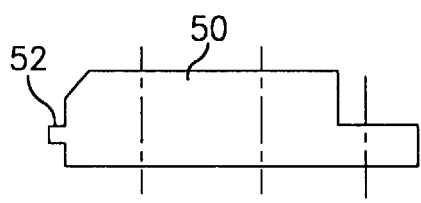
FIGS. 36–39, 39a, 39b and 39c: Transverse sections or a top view of different embodiments of assembly plates of the furniture system in accordance with the invention.
Figure 37:
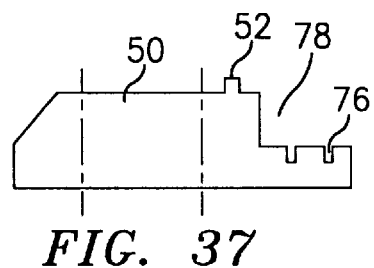
Figure 36A:
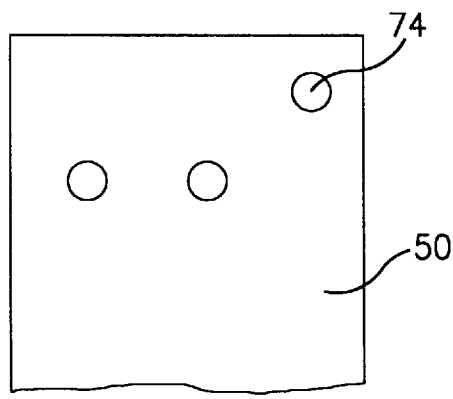
Figure 38:
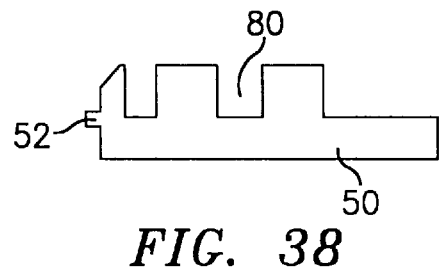
Figure 39:
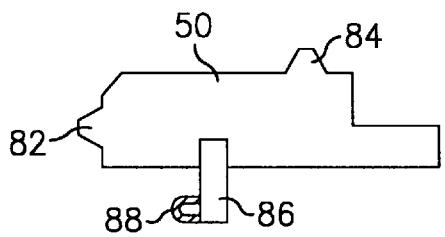

In FIGS. 36 to 39, various embodiments of the assembly plate 50 are shown. FIG. 36 here shows a cross-section view and a top view of the assembly plate 50 while FIGS. 37 to 39 show in each case only cross-sections of the assembly plate. The assembly plate 50 in accordance with FIG. 36 corresponds to that of FIG. 8. In the top view, a series of pre-bored holes and screw boreholes 74 are shown which serve to accept standard fittings. At the side, a protrusion 52 is provided on the assembly plate 50 which serves to adjust and prevent raising under area strain by a side wall applying a pressure load in the inside direction of the furniture or a force directed outwards of hinge fixed in the function strip. The protrusion 52 meshes with a corresponding recess in the connecting element 16 (cf FIG. 8). All in all, the dimensioning of the side screw connection can be selected smaller thanks to this form-locking meshing of the protrusion 52 with the corresponding recess of the connecting element 16.

Figure 39A:
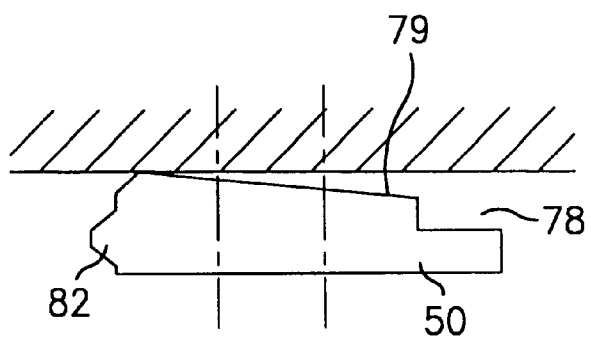

In the assembly plate 50 shown in FIG. 37, the protrusion 52 is positioned in another place. In addition, recesses 76 are provided here in which rubber lips (not shown in detail here) or similar spacers can be inserted to compensate for different side wall thicknesses and tolerances of the side walls of side walls to be inserted which are not shown in detail here and which come to lie in the recess 78. In principle, however, different side thicknesses can also be realized by different recesses 78. A further embodiment of the assembly plate is shown in FIG. 38 where recesses are provided referred to with 80 here in the assembly plate, these recesses serving to save weight. Finally, FIG. 39 shows another different embodiment of the assembly plate 50 which possesses two conical guides 82 and 84 and an integrated stop rail 86 with seal 88. The seal 88 is optional and can be omitted if desired. In the embodiments in accordance with FIGS. 39a, 39b and 39c, variations of the embodiment in accordance with FIG. 39 are shown. In the variation in accordance with FIG. 39a, the assembly plate possesses a diagonal support surface 79 which allows a narrowing of the space formed by the recess 78 by a corresponding tightening of the assembly screws and thus allows an adjustment to the side wall thickness of the side wall not shown in detail here.

Figure 39B:
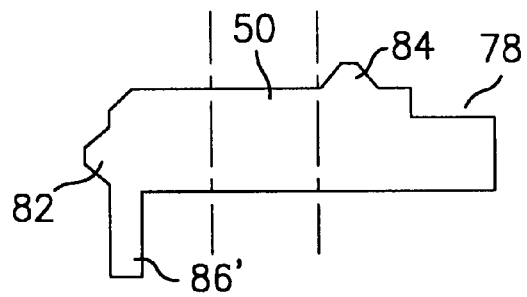
Figure 39C:
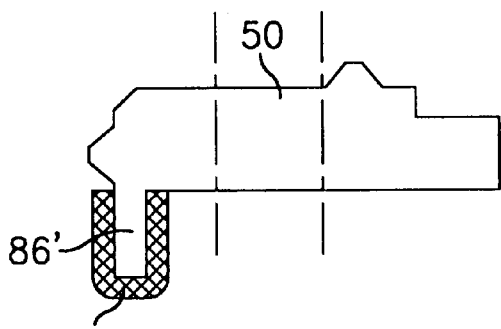

In the embodiment in accordance with FIG. 39b, the stop rail 86' is shaped in a fixed position on the assembly plate 50. In FIG. 39c, however, the stop rail 86' is covered with a U-shaped rubber strip 87.

Figure 40:
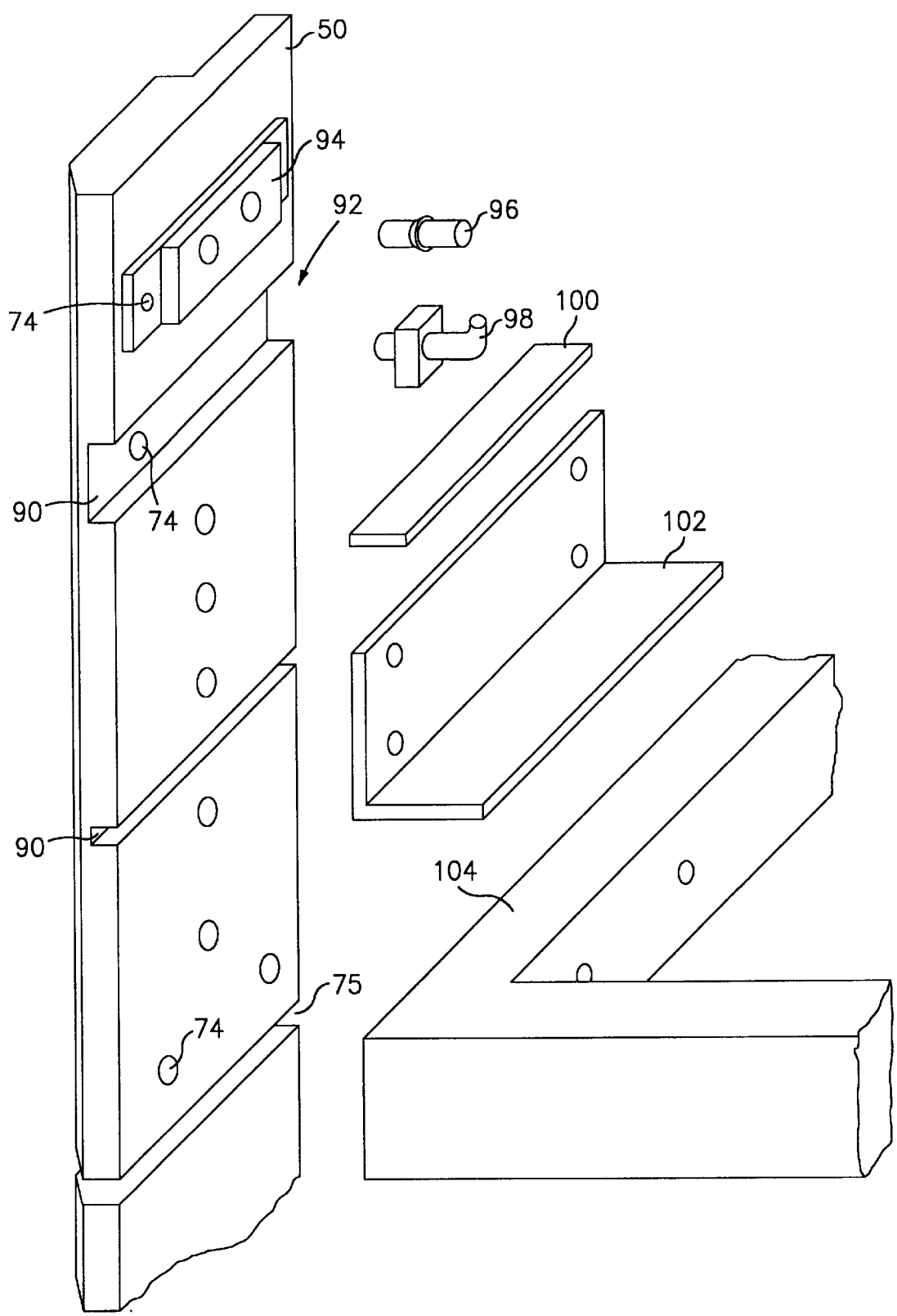

In FIG. 40 an assembly plate with a series of different functional fittings is shown. The assembly plate 50 possesses a series of boreholes 74. Furthermore, cuts or recesses 90, 92 exist. A hinge pedestal 94 in its mounted position is also shown in FIG. 40. With 96 and 98 different compartment bottom supports as are of standard construction are shown. The rail 100 also represents a compartment bottom support which is fitted in a recess 90 and can be inserted into it. 102 refers to a support bracket which can be connected to the assembly plate by screws. Finally, 104 shows a frame for a bottom panel which can also be connected to the assembly plate by screw connection. The assembly plate offers a variety of variable mounting possibilities for the different fittings, components and functional parts. The assembly plate 50 can be holed, as referred to here with breakthrough 75 in order, for example, to accept a frame 104, too. The break 75 can also be formed in a longer shape, which leads to savings in material and thus to a reduction of costs and weight.

Figure 41:
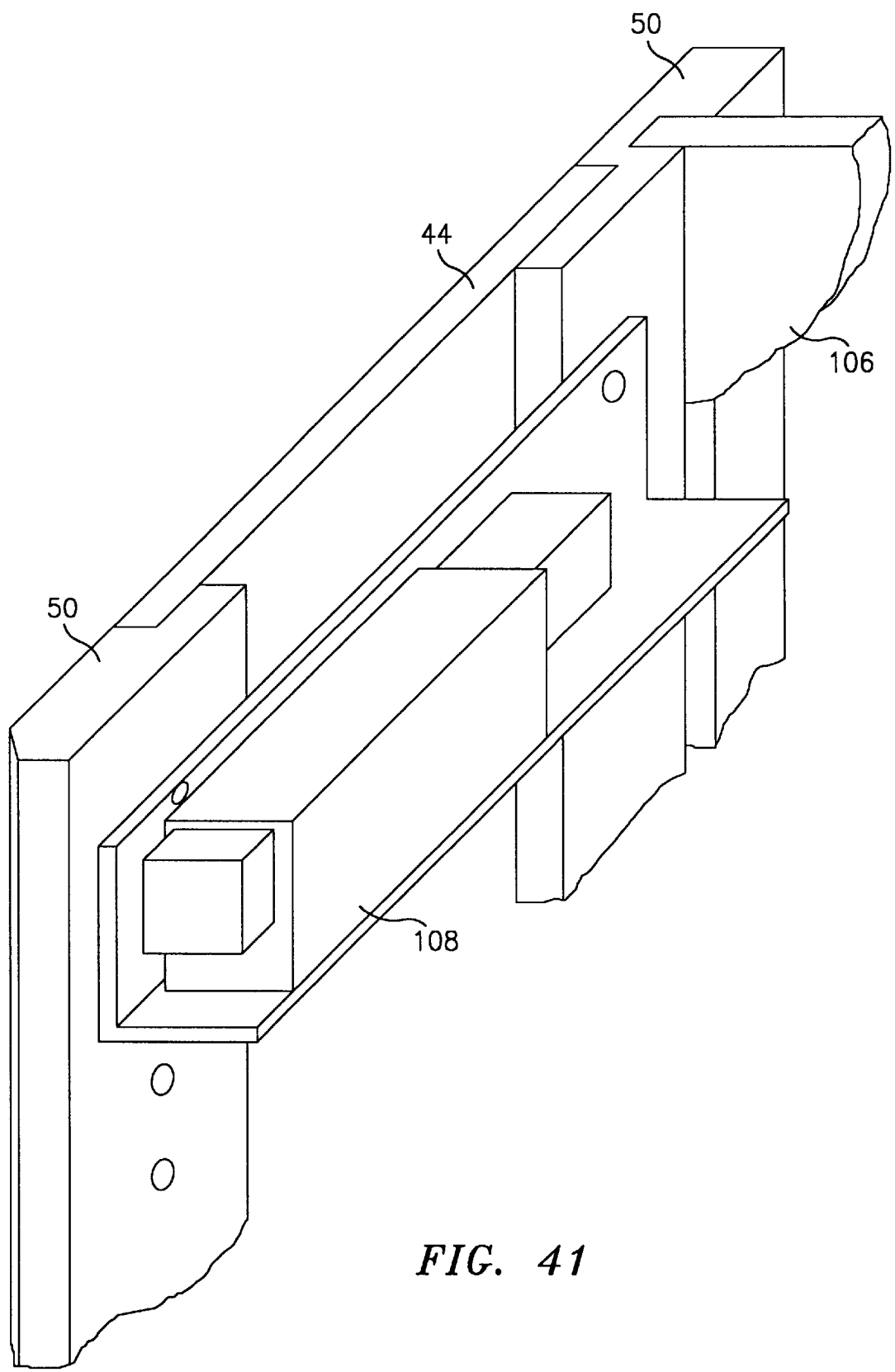

In FIG. 41 another typical fitting situation is shown in a perspective view of two assembly plates 50 in the basic framework not shown in detail here. A side element 44 is held between the two assembly plates 50. In addition, in the rear assembly plate 50, a rear wall 106 shown here only in section is inserted in a corresponding groove. To the side and the inside, a standard drawer guide 108 is screwed into place in screw boreholes correspondingly provided in the assembly plates 50.

Figure 42:
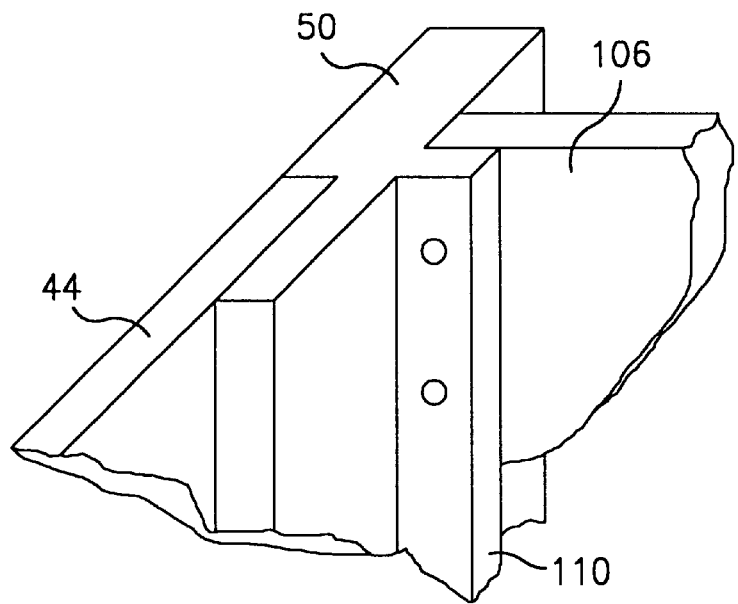
Figure 43:
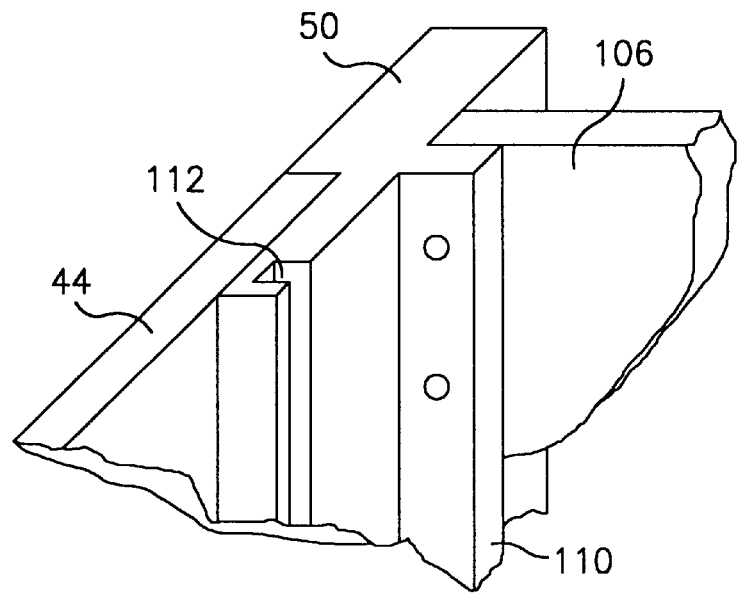
Figure 44:
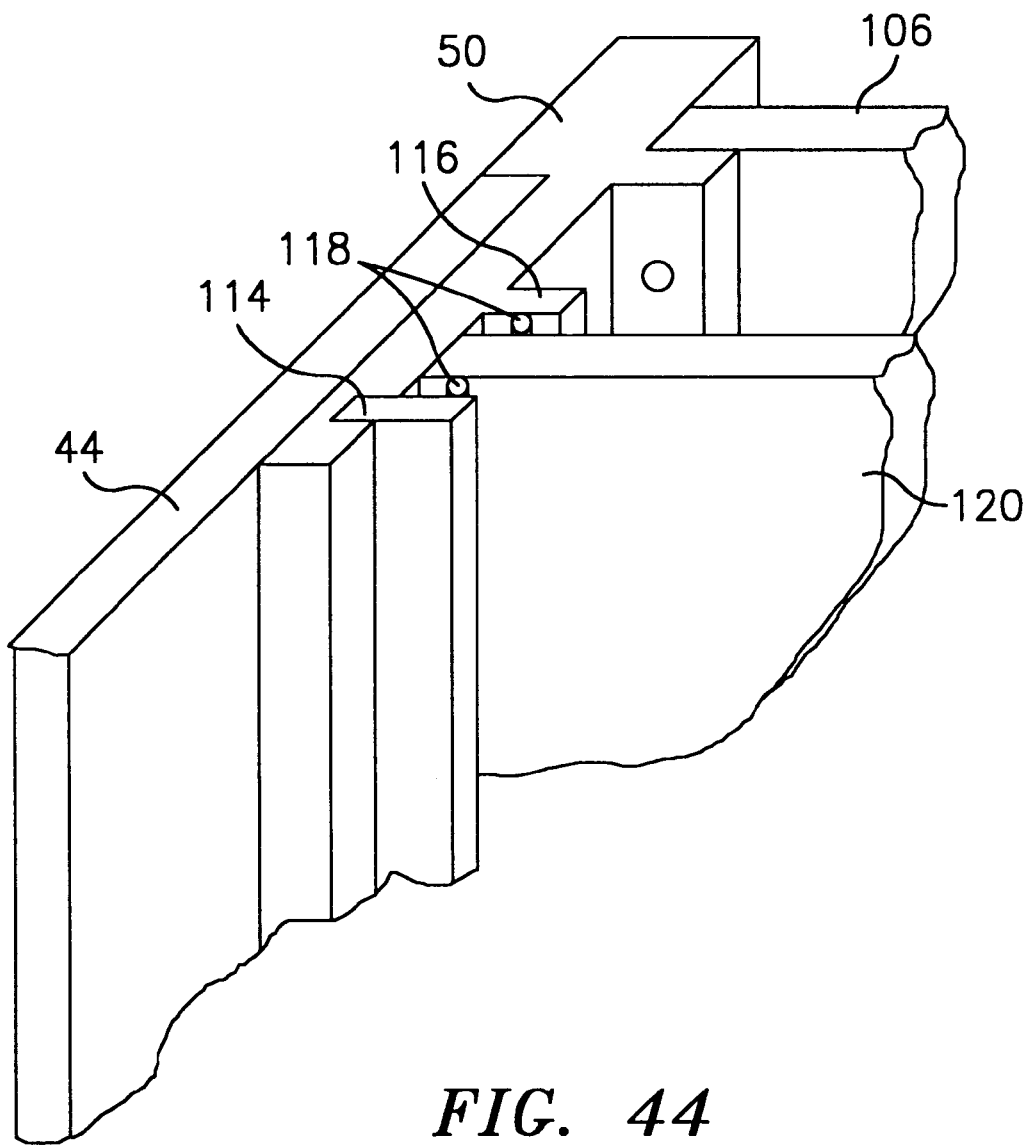
Figure 45:
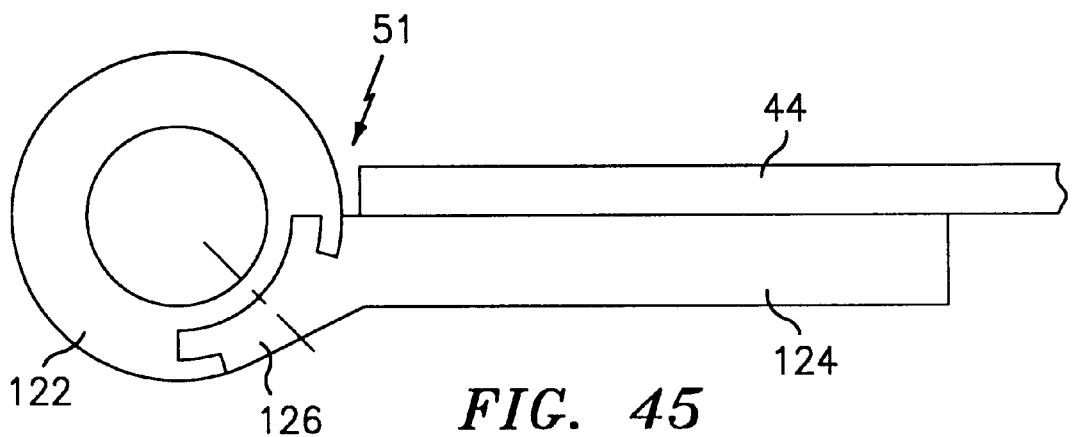
FIGS. 45–49: Transverse sections of embodiments of the connecting element with basically different designs.

In FIG. 42 an alternative embodiment of the rear assembly plate 50 is shown which possesses an integrated stop rail 110 which the rear wall 106 can be screwed onto. In the embodiment in accordance with FIG. 43, an assembly plate 50 is shown which also possesses a stop rail 110 to screw on the rear wall 106 and additionally a groove 112 in which a further intermediate wall can be inserted. By means of the further insertable intermediate wall not shown in detail here and the rear wall 106, a separate compartment is thus formed in the kitchen furniture. FIG. 44 possesses a rear assembly plate 50 which corresponds essentially to that in accordance with FIG. 43, Here, however, a removable clamping strip 114 is inserted in the recess 112 which works together with an stop rail 116 additionally shaped on the assembly plate and two rubber seals 118 in order to hold a further rear wall 120 which can be removed from the inside of the kitchen furniture.

In the embodiment in accordance with FIG. 44a the mounting of a rear wall 106 without the provision of any additional mounting plate is shown. Here, a connecting element 16 according to an embodiment of FIG. 35a is fitted with a projection 210 shaped in one piece onto which the corresponding rear wall 106 can be screwed.

In the embodiment in accordance with FIG. 44b a rear wall 106 is screwed onto a lower bottom panel 220 so that it stands out perpendicularly upwards. In the embodiment in accordance with FIG. 44c, an upper bottom panel 222 is positioned with a component 224 positioned below it in which a groove 226 is recessed. In this groove 226, a bent-over part of a rear wall 106 is inserted on which one or more burls 228 are provided. This represents a further possibility of rear wall mounting. For a stable mounting of a rear wall 106, the mounting possibilities given in FIGS. 44a, 44b and 44c are combined with one another.

In FIGS. 45 to 49 another type of construction of a connecting element 51 is shown. The connecting element 51 is here constructed in two parts and consists of a hollow section 122 and a projection 124. A shape recess is provided in the hollow section in which a corresponding shaped projection 126 of the projection 124 can be inserted and fixed by means of a screw connection shown here as a dotted line. As already described in detail above, an assembly plate can be fitted to the projection 124 or, however, a side wall alone. In accordance with a further embodiment, however, the projection 124 can itself be designed as an assembly plate.

Figure 46:
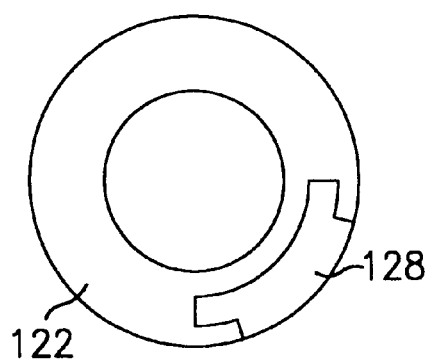
Figure 47:
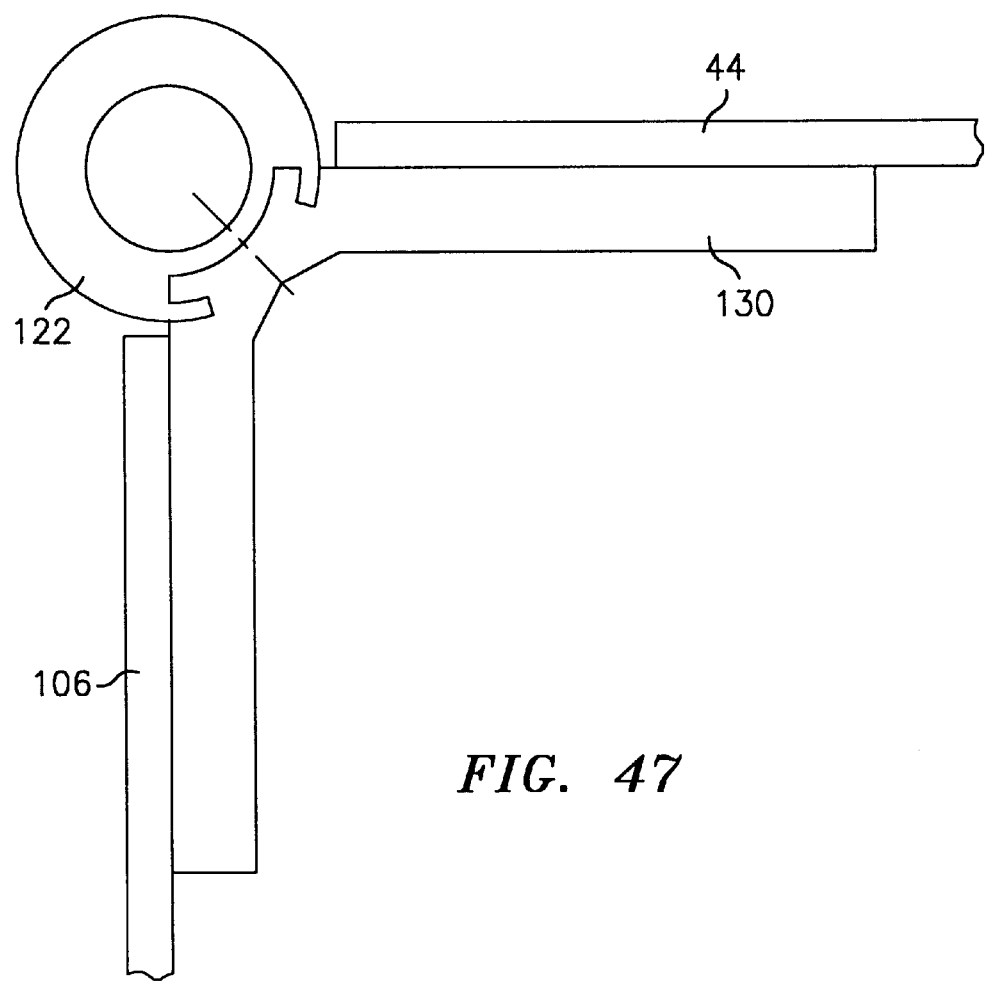
Figure 48:
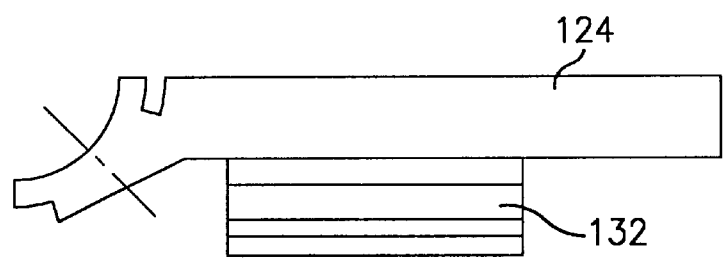

In FIG. 46 the hollow section 122 is shown with the shape recess in which a correspondingly shape-adjusted cover 128 is fitted. In FIG. 47 a dual projection whose parts are aligned at right angles to each other for a corner connection 130 are inserted in the hollow section 122. Side walls 44 or a rear wall 106 are also fitted to this dual projection. In FIG. 48 a projection 124 is shown which is here formed as an assembly plate, with in this representation a hinge pedestal 132 or all other functional parts being screwed on, on which a conventional design hinge can be pushed for a pivotable bearing of a door element.

Figure 49:
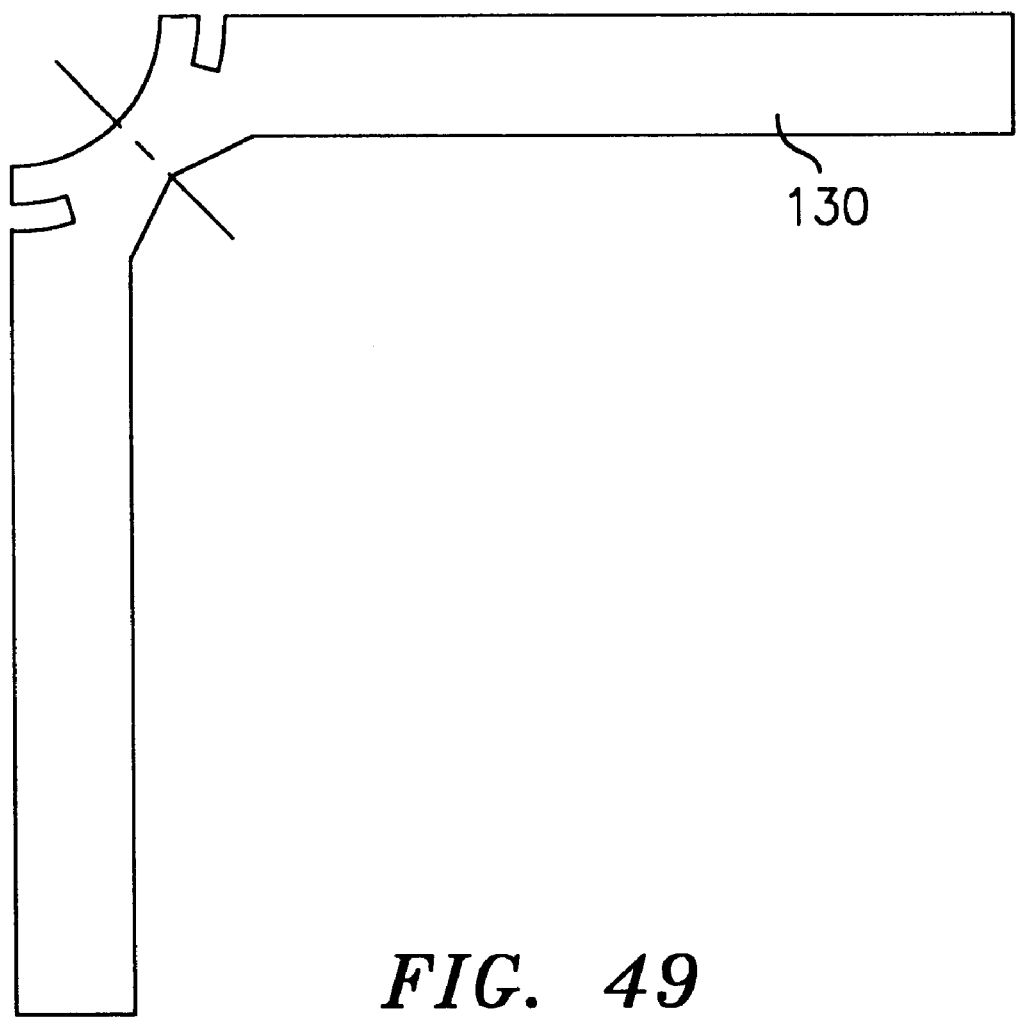
Figure 50:
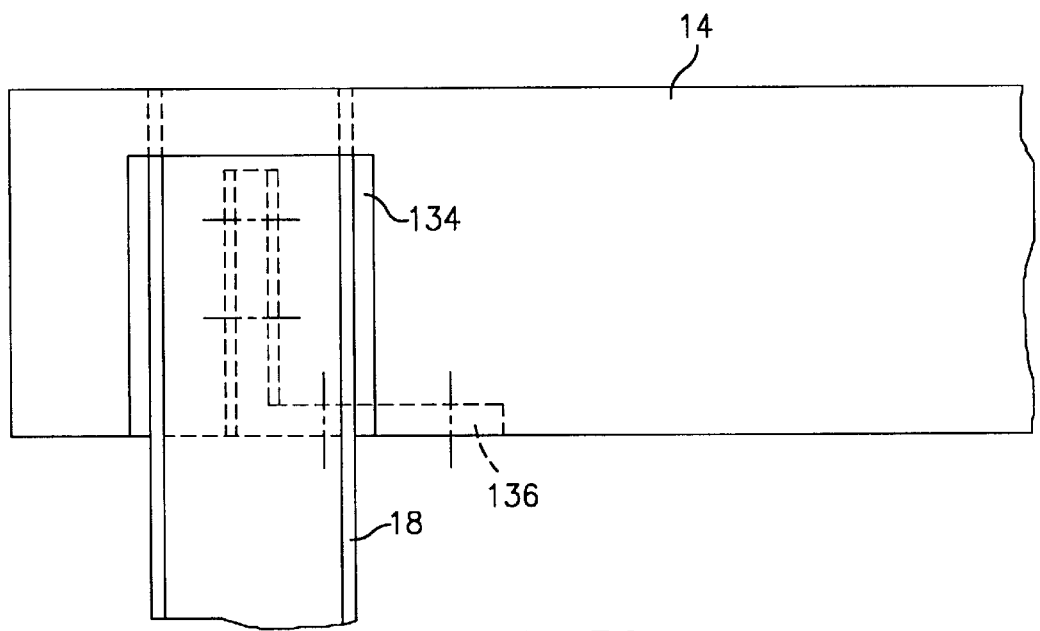
FIGS. 50–57, 57a, and 57b: Different transverse sections or top views through parts of the work surface fixture to the basic framework.

In FIG. 49 the projection part 130 with the two projections at right angles to each other is shown again. With regard to the use and possibility of modifying the connecting elements in accordance with FIGS. 45 to 49, reference can be made to the prior descriptions of the connecting element 51 or 16.

Figure 51:
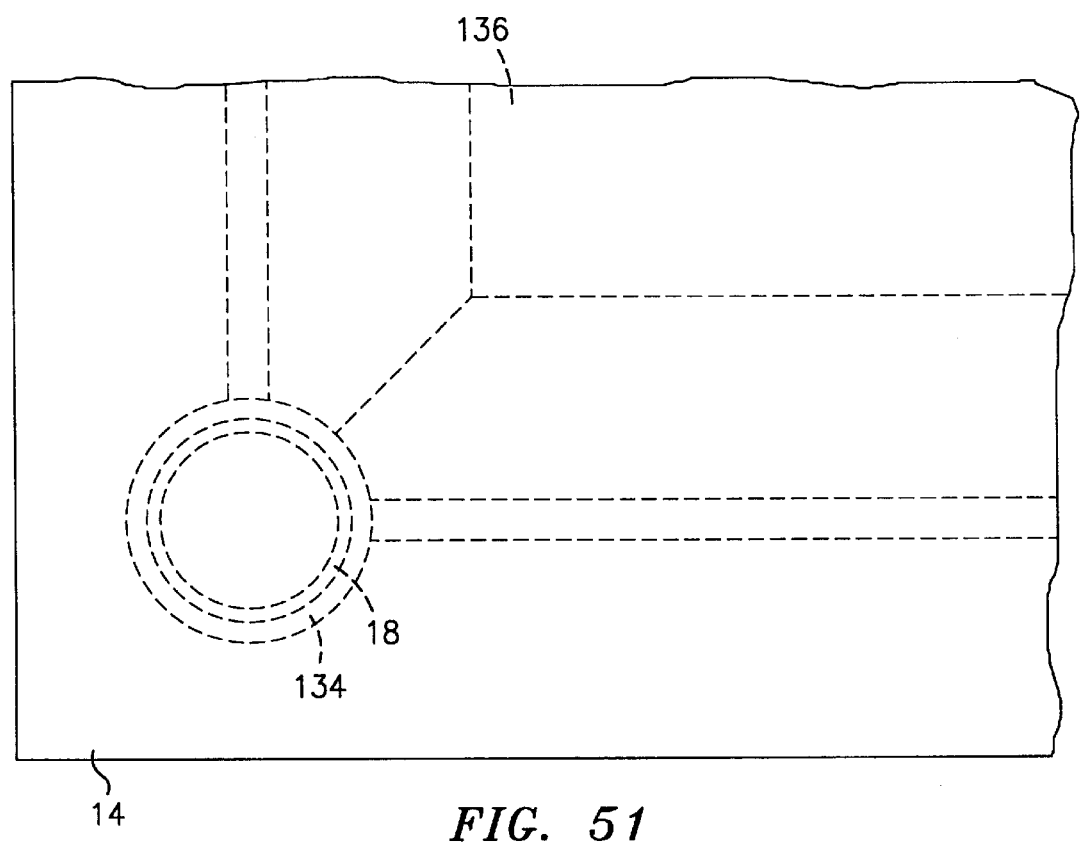
Figure 52:
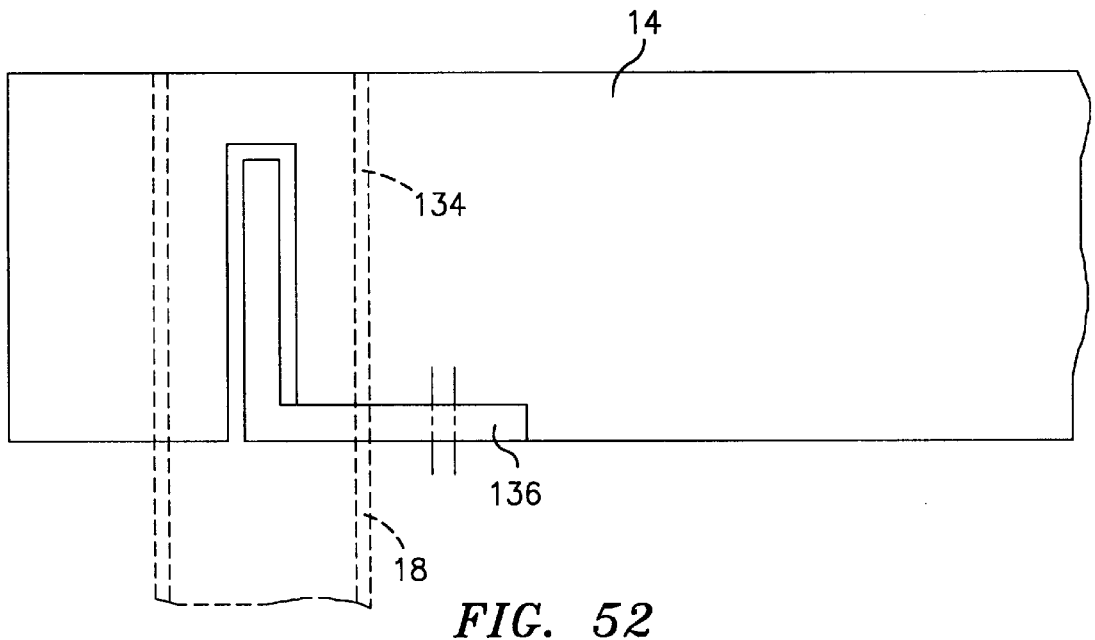
Figure 53:
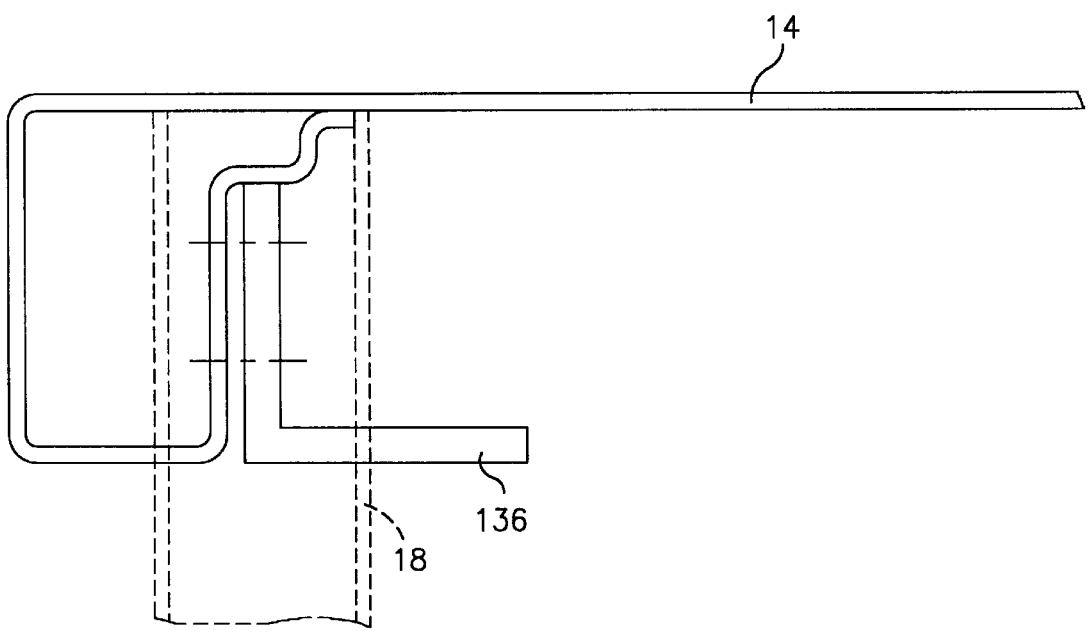
Figure 54:
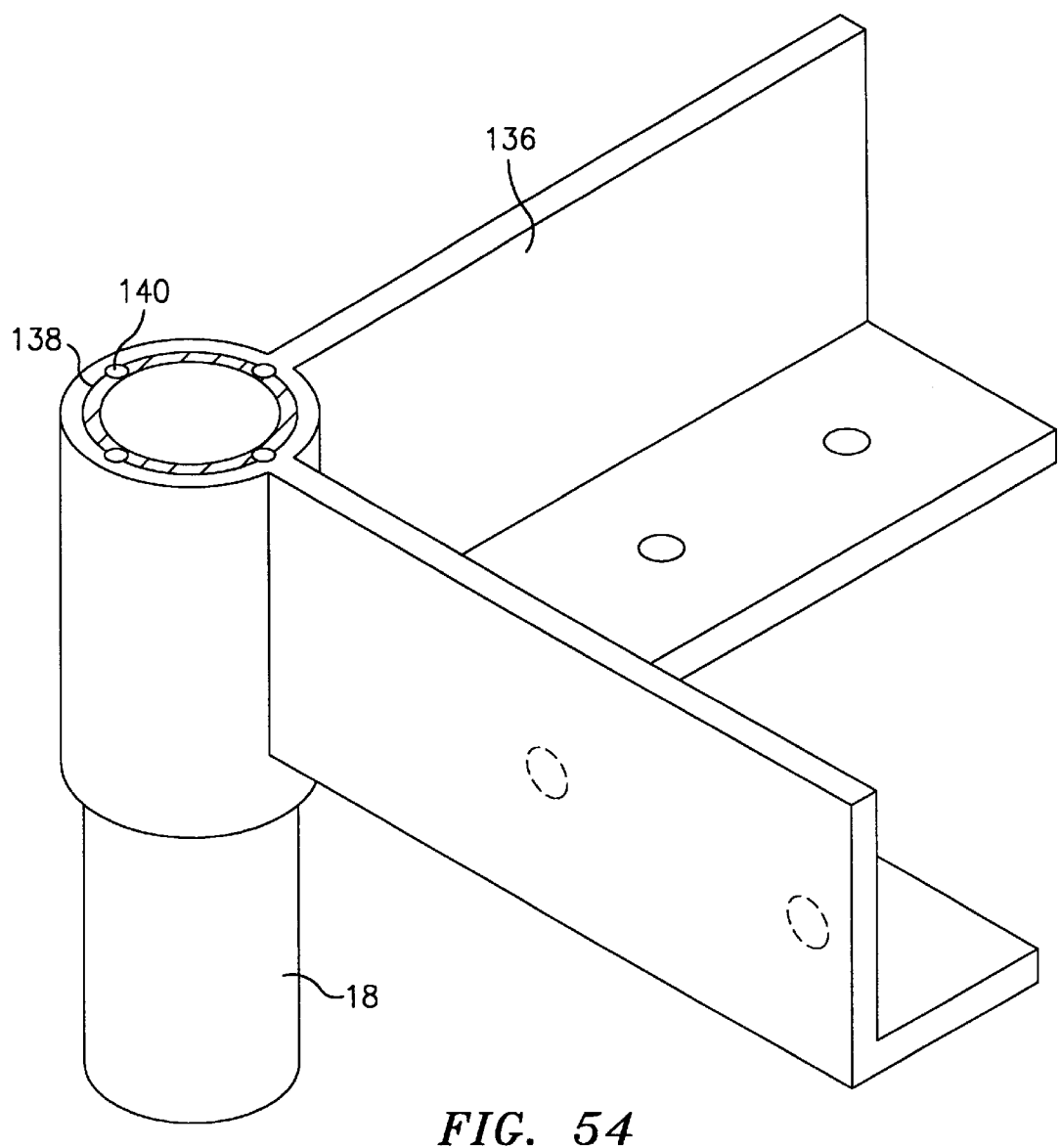

By means of FIGS. 50 to 57, the mounting of a workplate 14 on the basic framework 12 and here on the vertical tubes 18 of the basic framework 12 is shown. In principle, the workplate 14 can comprise any of wood, stone, glass, granite, a metal plate design or a suitable plastic. The workplate possesses a corresponding borehole or sleeve 134 which can be pushed over the ends of the tubes 18. Steel angle sections 136 can, for example, be fitted between the tubes as shown by broken lines in FIG. 50. Here, corresponding recesses are also provided in the workplate 14, for example to accept the steel angle section 136. This is shown in FIG. 52 in which a different section through the workplate is shown. In FIG. 51 this construction is shown in a top view, the contours not actually visible being represented by broken lines. In FIG. 53 the workplate 14 is made from a corresponding, edged metal sheet. In FIG. 54 it is shown in a perspective drawing how, for example, the mounting brackets 136 are connected to the pipe 18. Here, the mounting brackets 136 are welded with a sleeve 138 which are connected, for example with the tube end of tube 18 in a material connection by weld points 140. In place of the weld connection, however, a gluing, press-fitting, screwing or similar can be provided.

Figure 55:
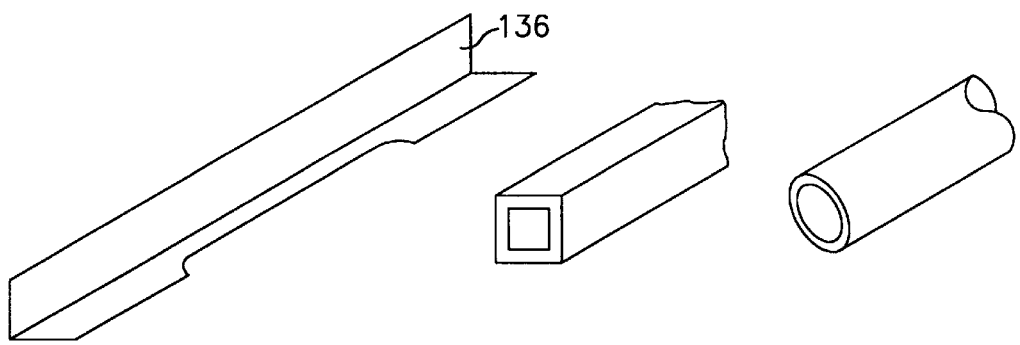

In FIG. 55 different contact possibilities are shown which can be used instead of the mounting bracket 136. For example, a corresponding bracket 136 is shown here which possesses a recess to save weight. Instead of a bracket, however, a square or a pipe can be used as well.

Figure 56:
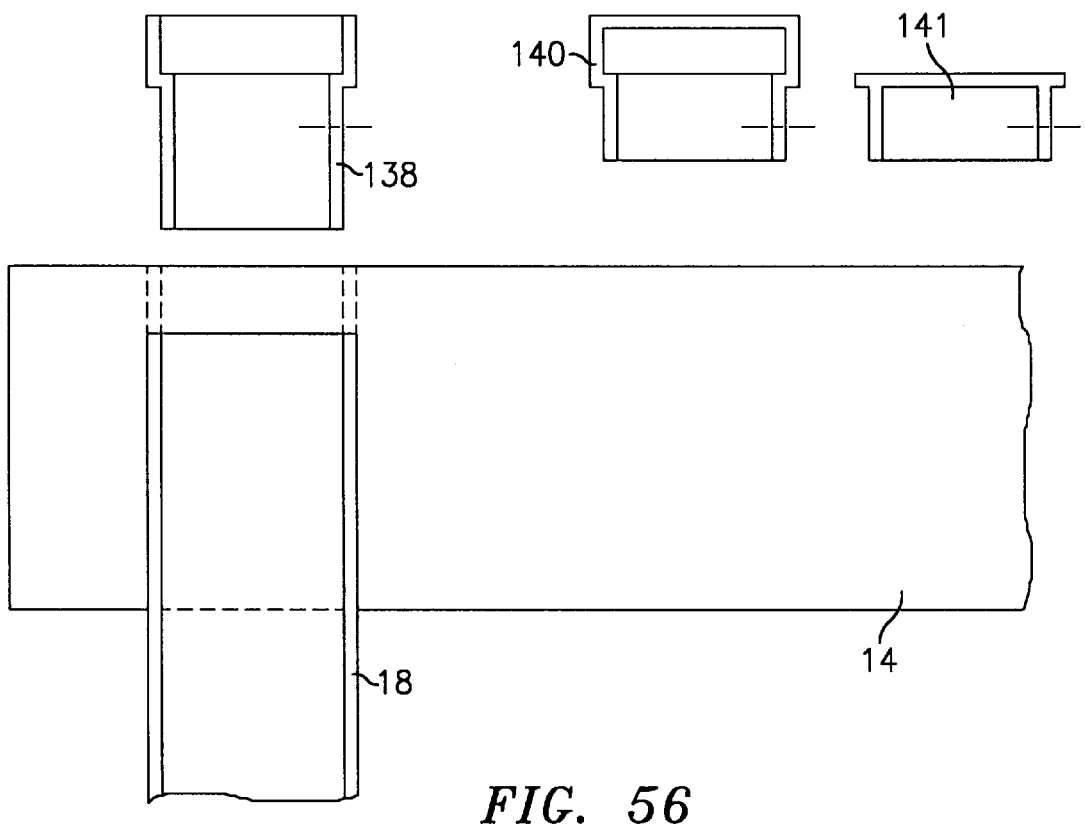
Figure 57:
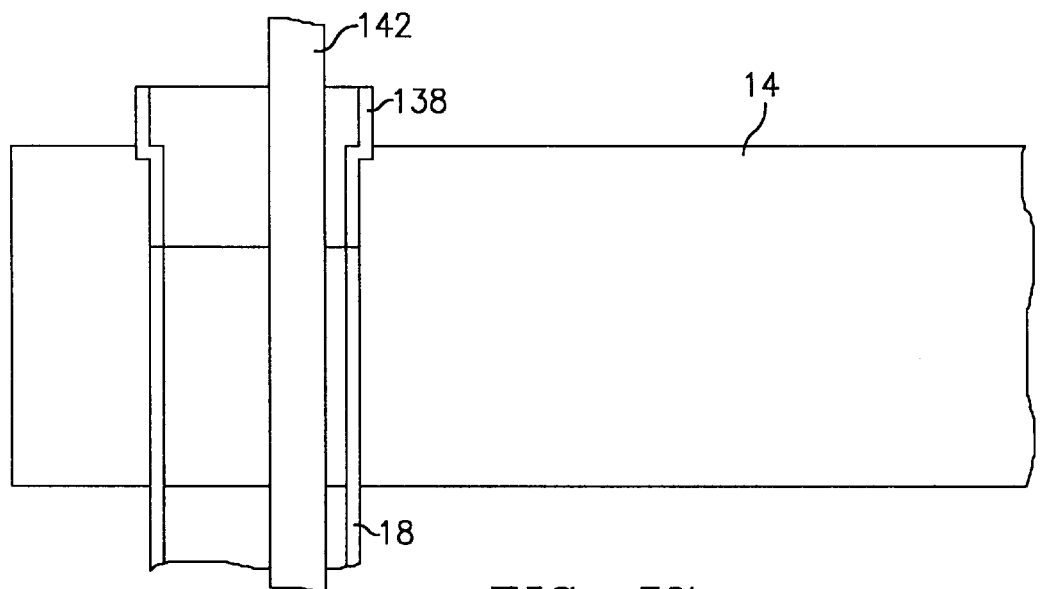

In FIGS. 56 and 57 a workplate 14 is shown in each case which is set on a tube 18 in the manner described above.

Here, however, the workplate 14 has breakthroughs in its full thickness in the area of the tube 18 so that here a farther tube piece 138 formed as an adapter can be inserted. In the upper expanded part of the tube piece 138 a further tube can be inserted on which, for example, a wall part, a panel not shown in detail or similar is held. Instead of the tubular part 138, a closing cap 140 or 141 also shown in FIG. 56 can be put on. In FIG. 57 the part 138 is shown in its assembled position. A power lead 142 which, for example, supplies power to illumination positioned on a rear wall (not shown in detail here), runs through the tube 18 and the tubular part 138 formed as an adapter.

Figure 57A:
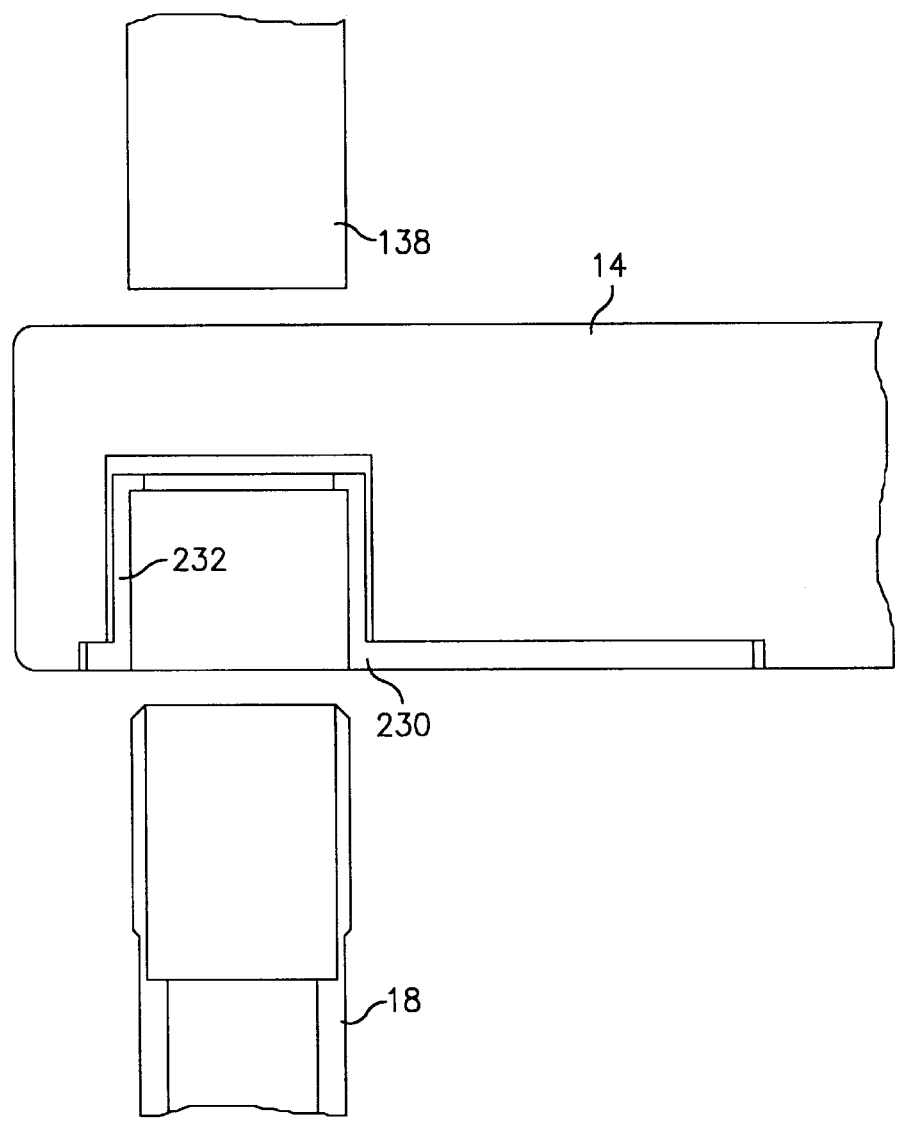
Figure 57B:
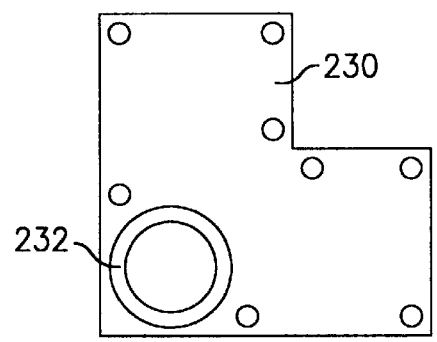
Figure 58:
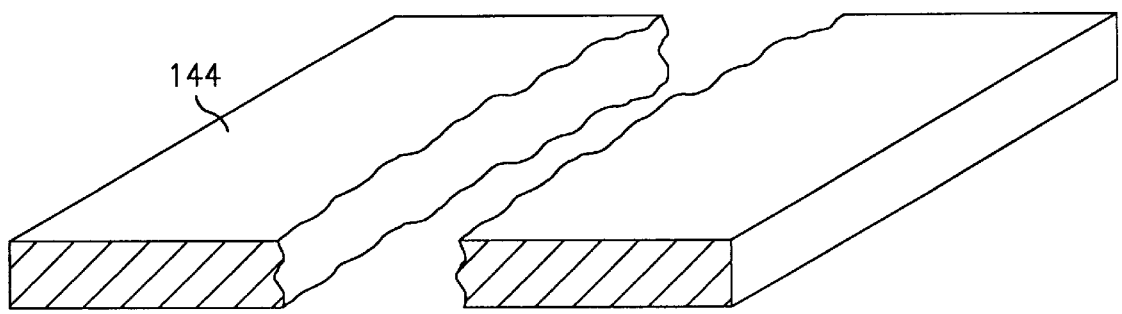
FIGS. 58–60, 60a, 61, 61a, 61b, 61c and 62–65: Various bottom panel variations for use in the basic framework of the furniture system in accordance with the invention.

In FIGS. 57a and 57b an alternative embodiment for the mounting of a workplate 14 is shown. In a corresponding recess at the corner in the workplate 14 a corner element 230 is inserted which can also be called an adapter. This adapter 230 is shown in a top view in FIG. 57b. The adapter 230 possesses a sleeve 232 in which the tube 18 can be fitted. The tube 18 contacts the collar-shaped end of the sleeve 232 after the plate is put on. As described above, a tubular part 138 can be inserted into the workplate 14 from above.

Figure 59:
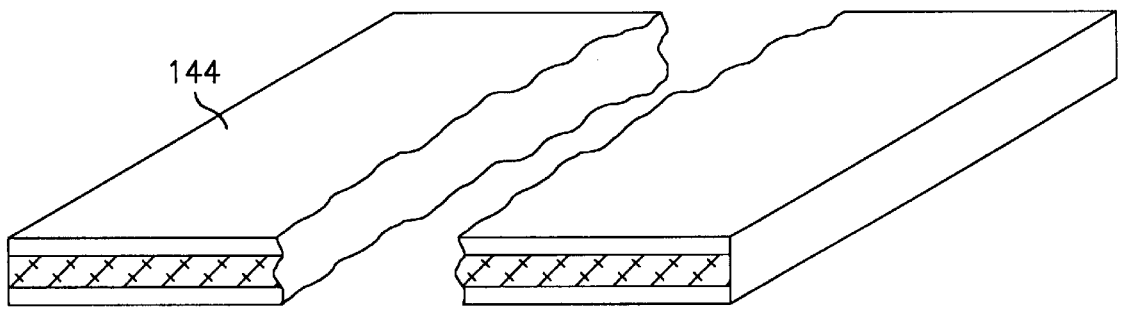

In FIGS. 58 to 65 bottom panel plates and holding levels 144 are shown. Here, in FIG. 58 a one-layer plate and in FIG. 59 a multilayer plate or honeycomb construction is shown. The bottom panel plates can consist of, for example, wood, such as preferably plywood or chipboard, aluminium foam, honeycombs, steel, stainless steel or other wide-area materials. In FIG. 59 a honeycomb construction is shown by way of example where the honeycomb preferably consists of paper, cardboard or aluminium and the top materials preferably of aluminium sheets, steel sheets, stainless steel sheets or wood.

Figure 60:
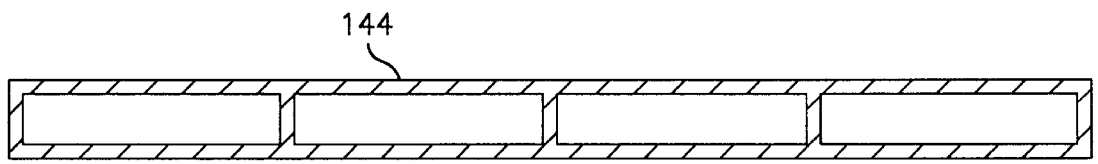
Figure 60A:
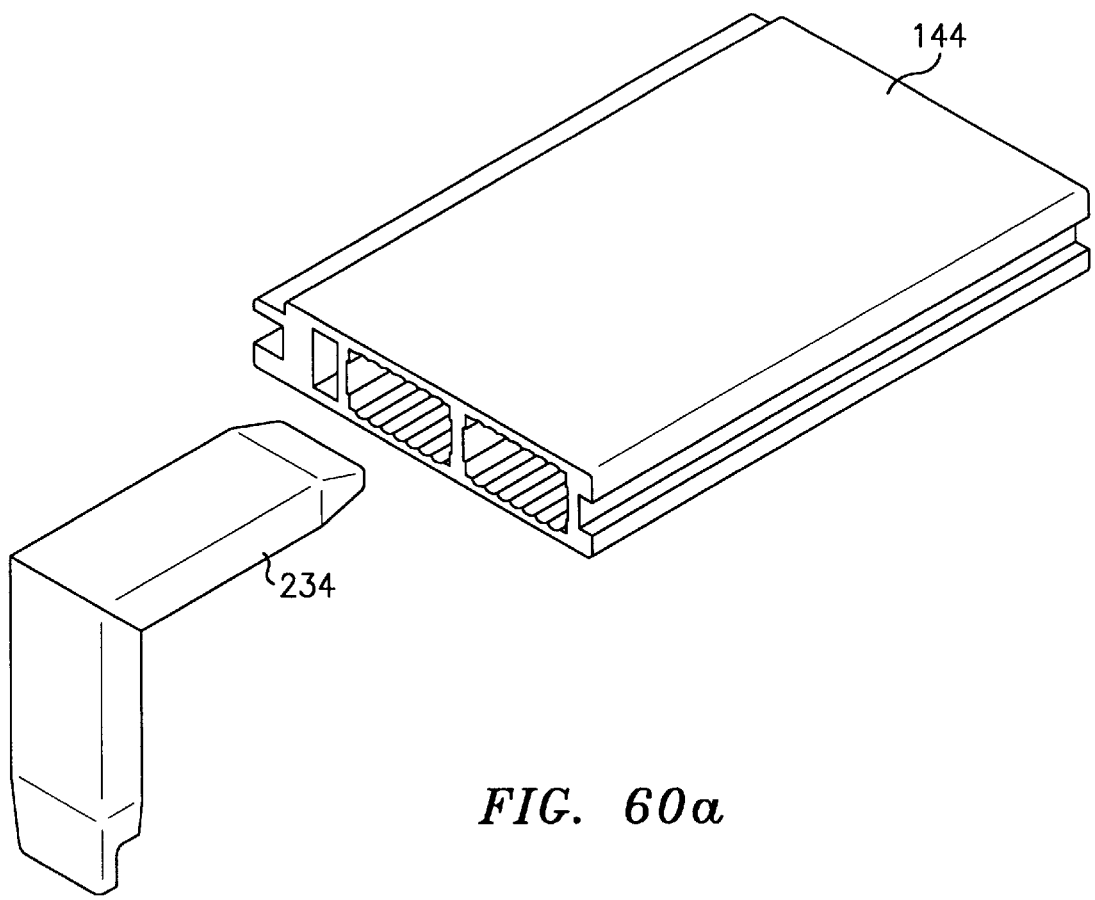
Figure 61:
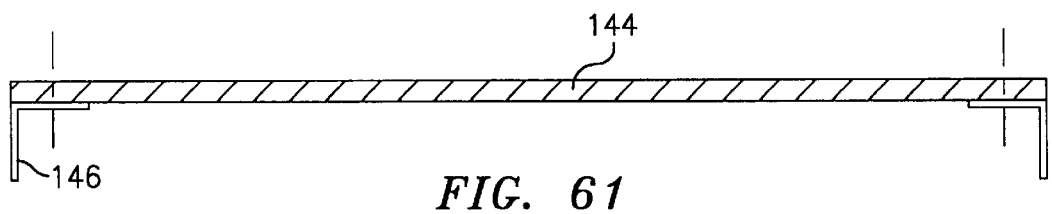
Figure 62:
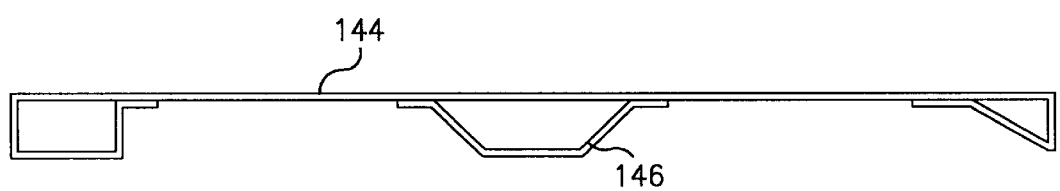
Figure 63:
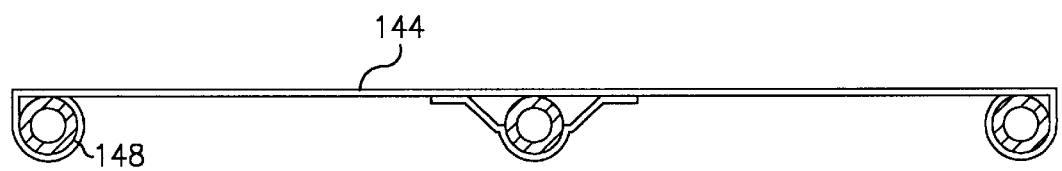
Figure 64:
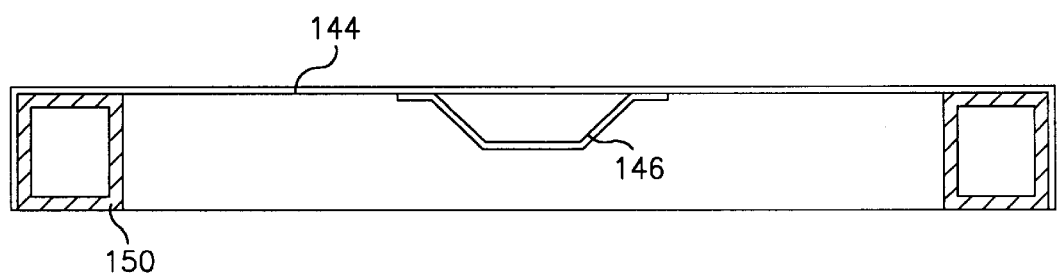

In FIG. 60 a section bottom panel 144 is shown which is formed as an aluminium section in a mono- or multipart design. In the multipart design, the sections are clipped together or pushed into each other. In accordance with FIG. 60a, a section bottom panel 144 can be hung by means of a correspondingly adapted corner connector 234. The free arm of the corner connector 234 can, for example, be inserted into a mounting aperture 208 of a connecting element 16 in accordance with FIG. 35a or 35b to mount the section bottom panel 144. With the embodiment of the bottom panel plate 144 according to FIG. 61, the bottom panel plate 144 is provided with a circumferential corner section 146, the section here being able to be formed as a frame and connected to the bottom panel 144 by screws. In the embodiment shown in FIG. 62 the bottom panel 144 is formed from an edged sheet, the side edgings serving for reinforcement and being able to be formed in a circumferential manner. In a manner not shown here, the corners of the edgings are welded for reinforcement. The flap 146 additionally provided in the centre on the underside of the bottom panel 144 can be connected to the bottom panel by welding or gluing. To achieve a higher stability of the bottom panel 144, additional sections can be mounted on the bottom panel lengthways and/or crossways. Further sections 148 can additionally also be inserted in the edgings as is described in detail by means of the embodiment in accordance with FIG. 63. In the embodiments in accordance with FIGS. 64 and 65, the whole bottom panel comprises a bottom frame 150 and a support surface 144 itself forming the bottom panel. The support surface 144 can now either be edged or placed on flap provided. For the additional reinforcement, a further section can be mounted on the frame as is shown in FIG. 65 or, however, the support surface of the bottom panel can possess corresponding reinforcement 146 as has already been explained by means of FIG. 62.

Figure 61A:
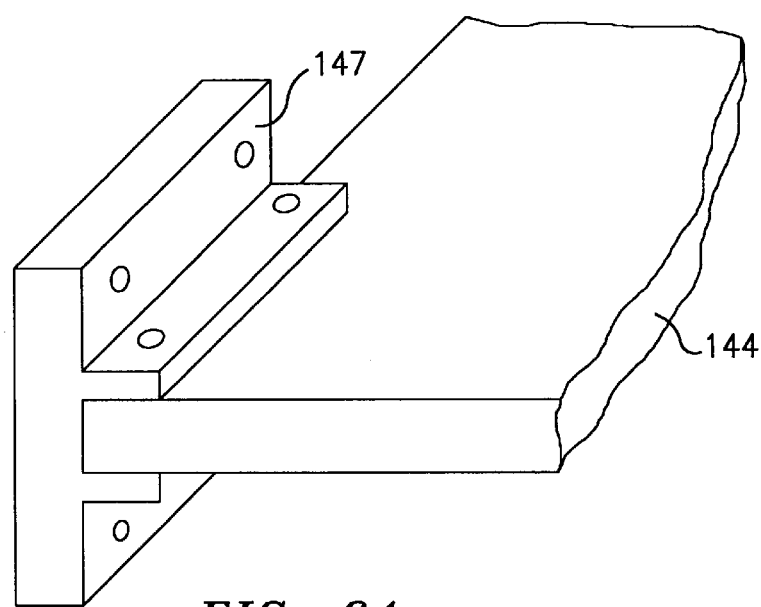
Figure 61B:
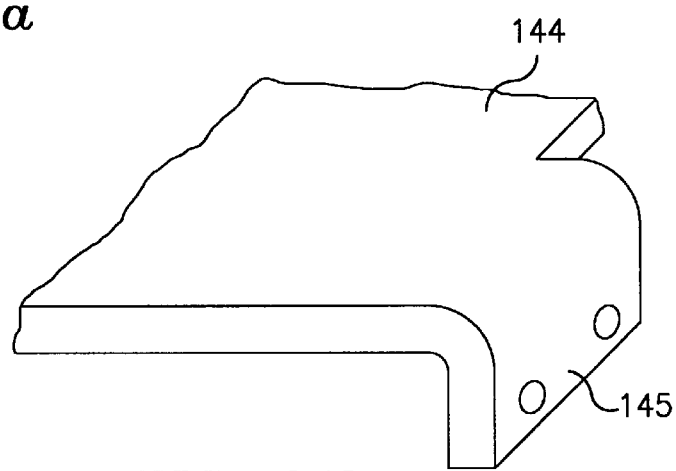
Figure 61C:
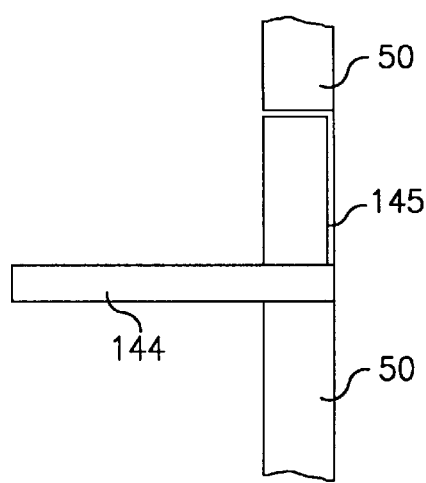

In FIGS. 61a, 61b and 61c alternative embodiments of the mounting possibility of the bottom panel plate 144 are shown. In the embodiment in accordance with FIG. 61a here, a compartment bottom support 147 is shown which can be fitted, for example, in a breakthrough of the functional strip 50 as is referenced by 75 in FIG. 40. In the embodiment in accordance with FIG. 61b, a bottom plate 144 made, for example, from sheet steel is bent over at least partially in the edge area so that a connecting flap 145 is formed which can be screwed together with an assembly plate 50 not shown in detail here. Finally, in FIG. 61c, a bottom panel plate 144 which consists of, for example, sheet metal, is connected to an assembly plate 50 by a bent-down sheet metal edge 145. The bottom panel plate 144 can naturally be of any other material.

Figure 65:
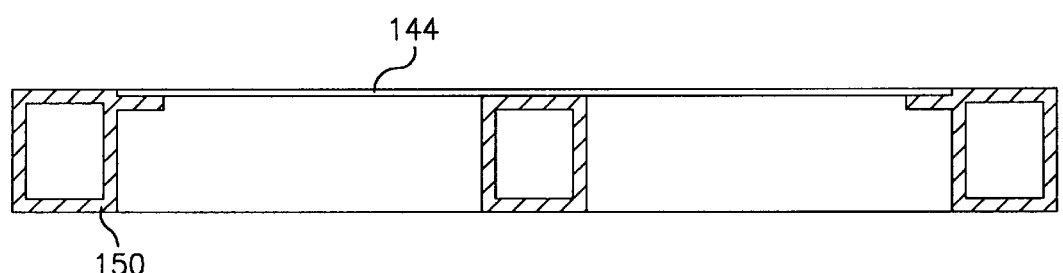
Figure 66:
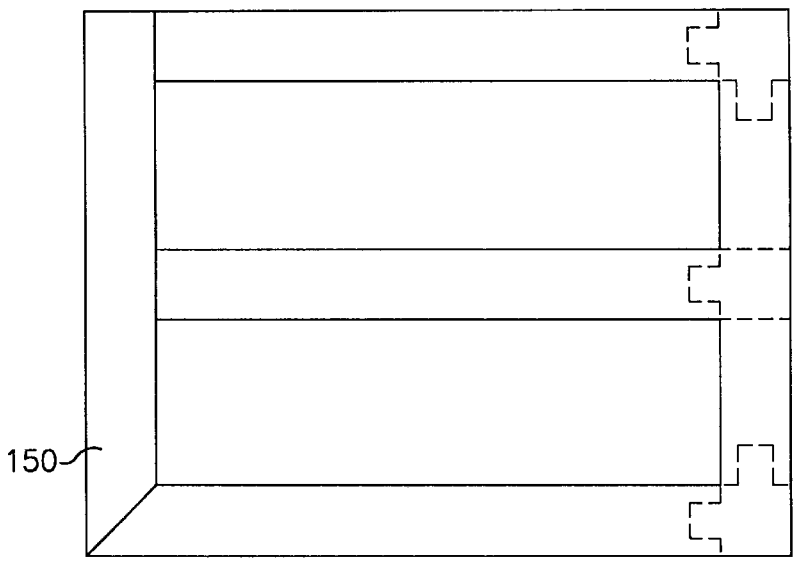
FIG. 66: A bottom panel frame as a top view for use in the furniture system in accordance with the invention.
Figure 67:
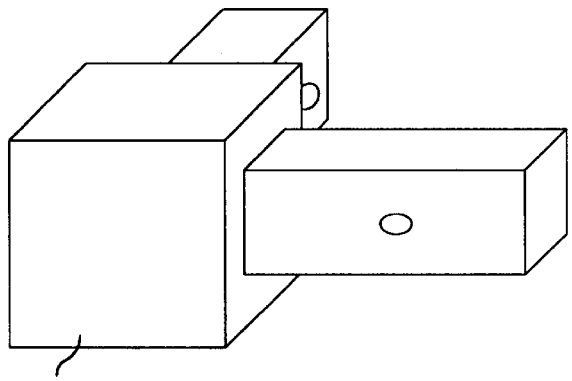
FIGS. 67–69: Different connecting parts for the floor frame of FIG. 66.
Figure 68:
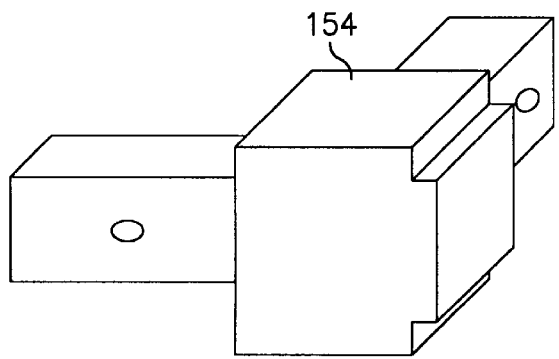
Figure 69:
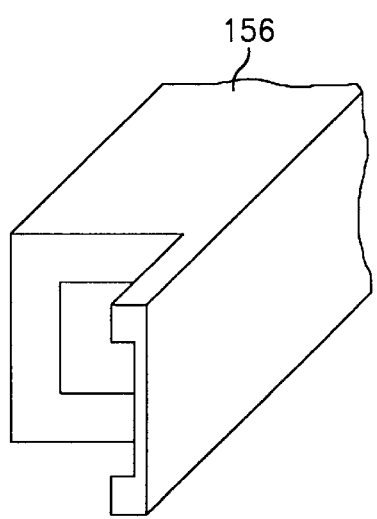

In FIG. 66 the bottom panel frame 150 is shown in accordance with the embodiment in accordance with FIG. 65 in a top view. The bottom panel frame can be connected to each other in a releasable or non-releasable manner. In FIGS. 67, 68 and 69, corner connectors for the sections of the bottom panel frame 150 are shown which are here referenced with 152, 154 and 156. These can be connected together with the bottom panel sections by means of a press fit or by screwing. By a corresponding milling of the individual section struts as shown in FIG. 69, the corner connection is hidden optically, ie seen from the front the floor panel is formed without any joins. The corner connectors can be mounted on the connecting element 16 or on the assembly plate 50.

In FIG. 70 a grating frame bottom panel 158 is shown which in a very simple embodiment can here be inserted into and fixed in corresponding grooves of the connecting element 16. Such a grating can serve, for example, as a so-called holding level, ie as a storage surface below the workplate.

Figure 71A:
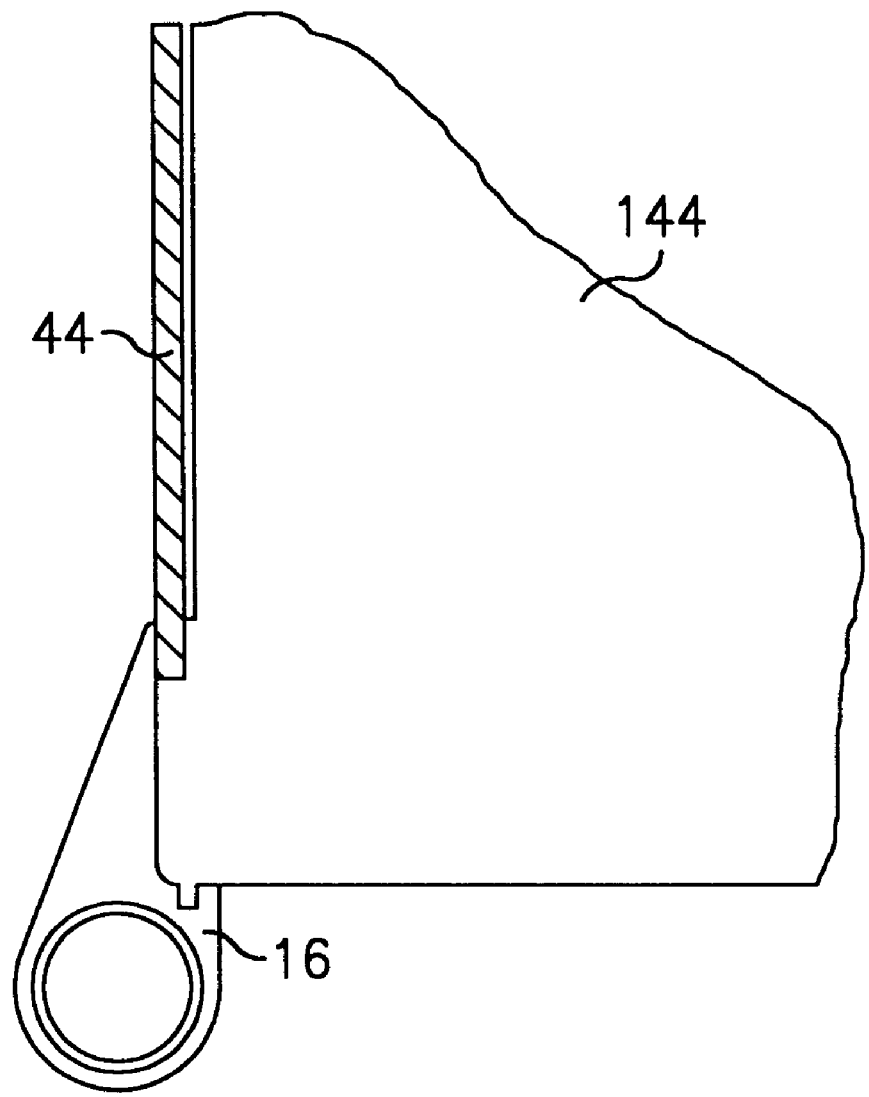

In FIG. 72 a floor panel is shown in top view which possesses recesses 160 in its corresponding corner sections. These recesses contact in their built-in version as shown in FIG. 71 the protrusion formed by the assembly plate 50 and thus offer a safeguard against accidental pulling out of the bottom panel 144. A corresponding embodiment without an assembly plate 50 is shown in FIG. 71a.

In FIGS. 73a, b and c and in FIGS. 74a, b and c, prefabricated assemblies of floor panels, sides and real wall elements are shown which can be inserted into the basic framework 12 as integrated components. In the embodiment in accordance with FIG. 74, the elements are joined together from several parts with simple screw connections or spot-welded together.

Figure 75:
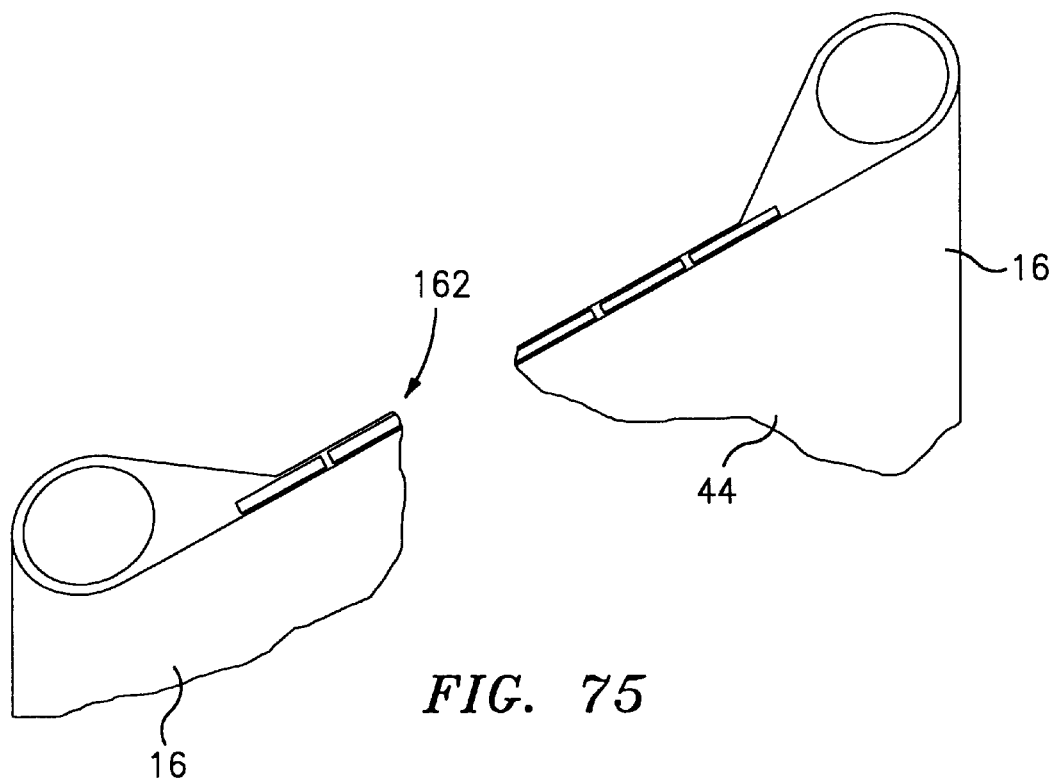
FIGS. 75, 76: An alternative embodiment of the furniture system in accordance with the invention.

In FIG. 75 an integrated side part 162 is shown which integrates in one piece two connecting elements 16 and one side part 44. The side part 44 is formed here as a hollow chamber aluminium section to save weight.

Figure 76:
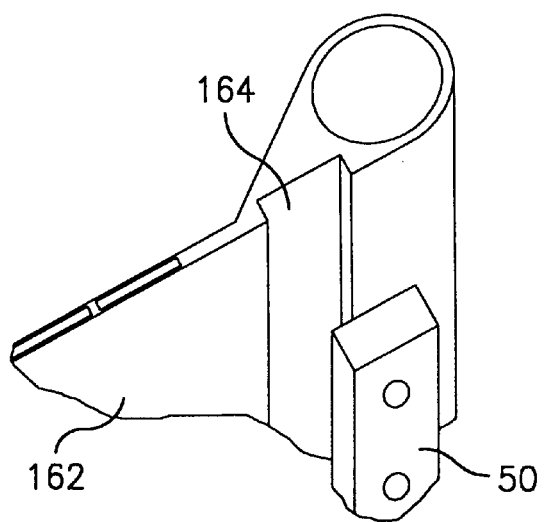

In the embodiment in accordance with FIG. 76, the integrated assembly 162 of FIG. 75 is shown where additionally a groove 164 is provided in which an assembly plate 50 can be inserted.

Figure 77:
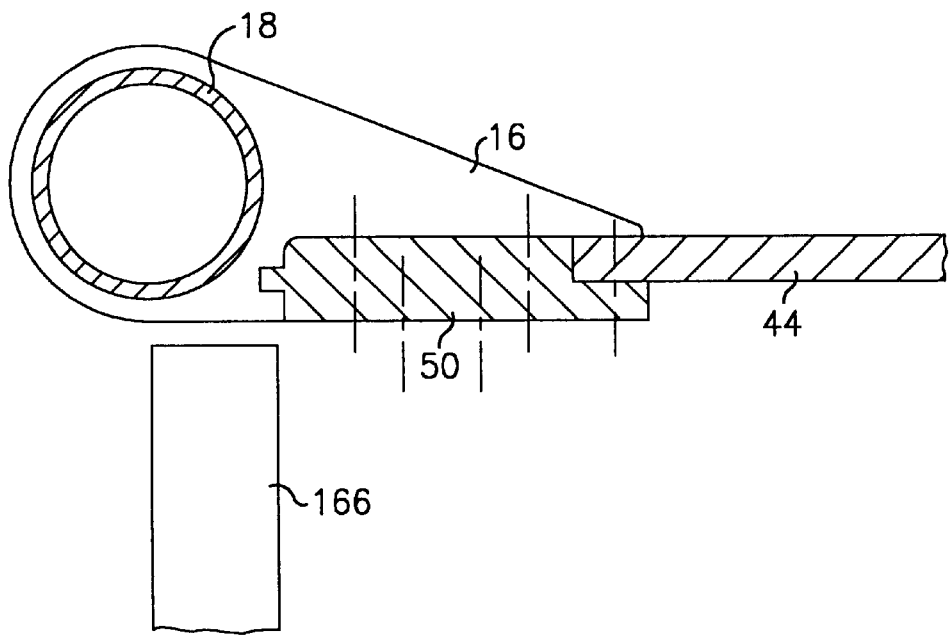
FIGS. 77, 78, 79, 80, 80a and 80b: Cross-section views of various fitted situations in the furniture system in accordance with the invention.
Figure 78:
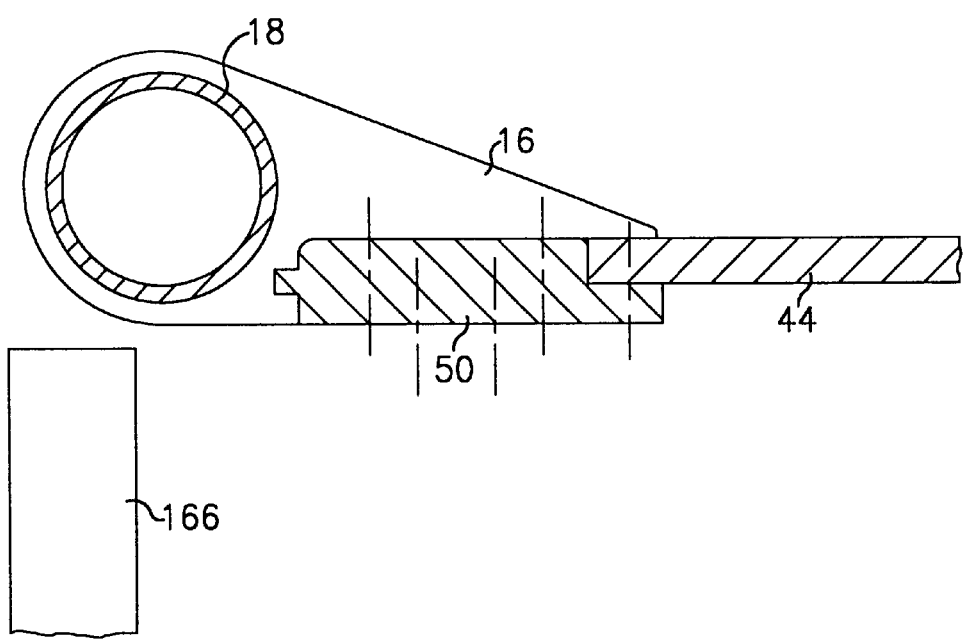
Figure 79:
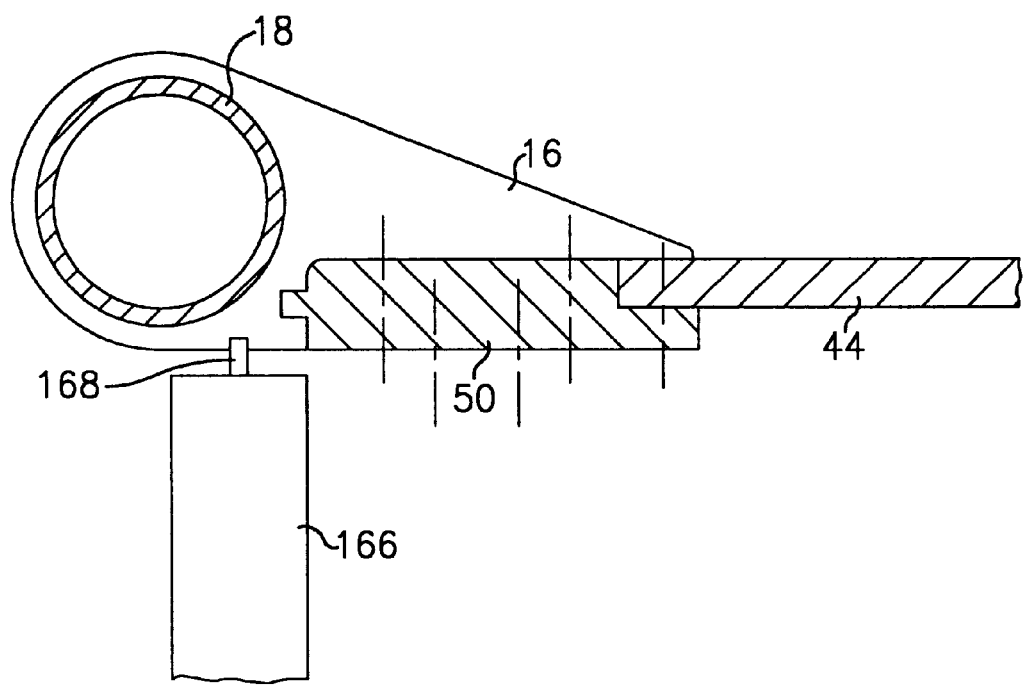

In FIGS. 77 to 80, the embodiment in accordance with FIG. 8 is again taken up, with different arrangements of the kitchen cupboard front plate 166 being shown here. In FIG. 77 the kitchen cupboard front plate is positioned behind the centre line of the hollow section of the connecting element 16. A gap is possible between the connecting element 16 and the front plate. In FIG. 78 an embodiment is shown where the kitchen front plate is in front of the central line of the hollow section of the connecting element 16. A gap between the kitchen front plate 166 and the connecting element 16 is also formed here. In the embodiment in accordance with FIG. 79, an arrangement in accordance with FIG. 77 is selected where a seal 168 is fitted as a sweep seal made from an elastic material or a brush, this being mounted and held here in this embodiment in a groove of the connecting element and sealing off the inside area of the kitchen furniture from dust, grime, vermin or similar. In the embodiment in accordance with FIG. 80, a seal 170 is formed here as a stop seal from elastic material or a brush which is here held in or glued into a groove of the assembly plate 50.

Figure 80:
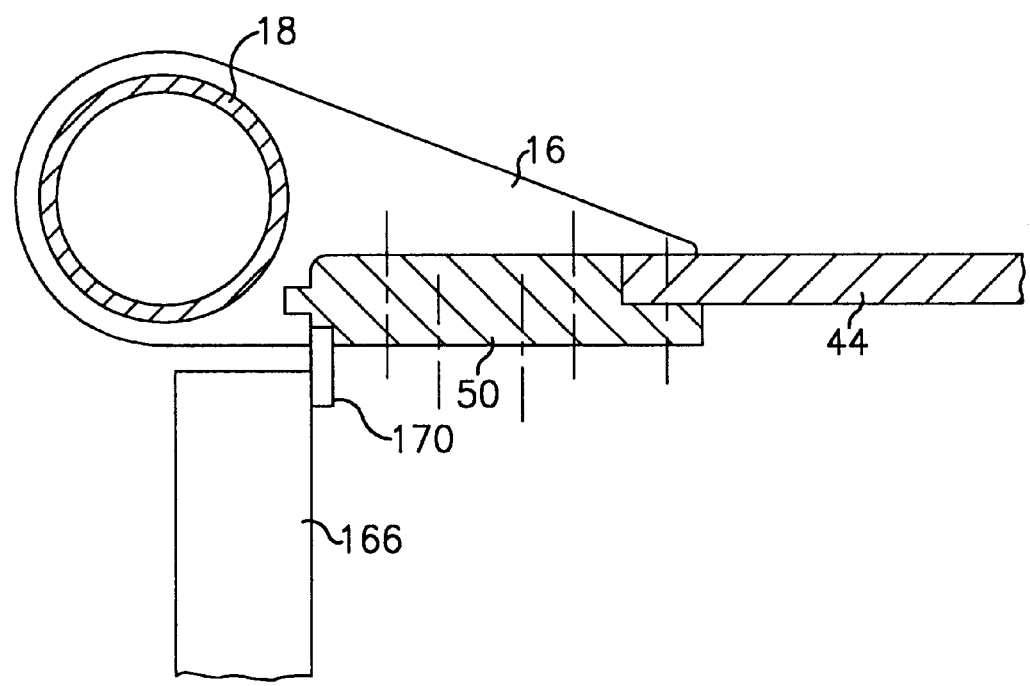
Figure 80A:
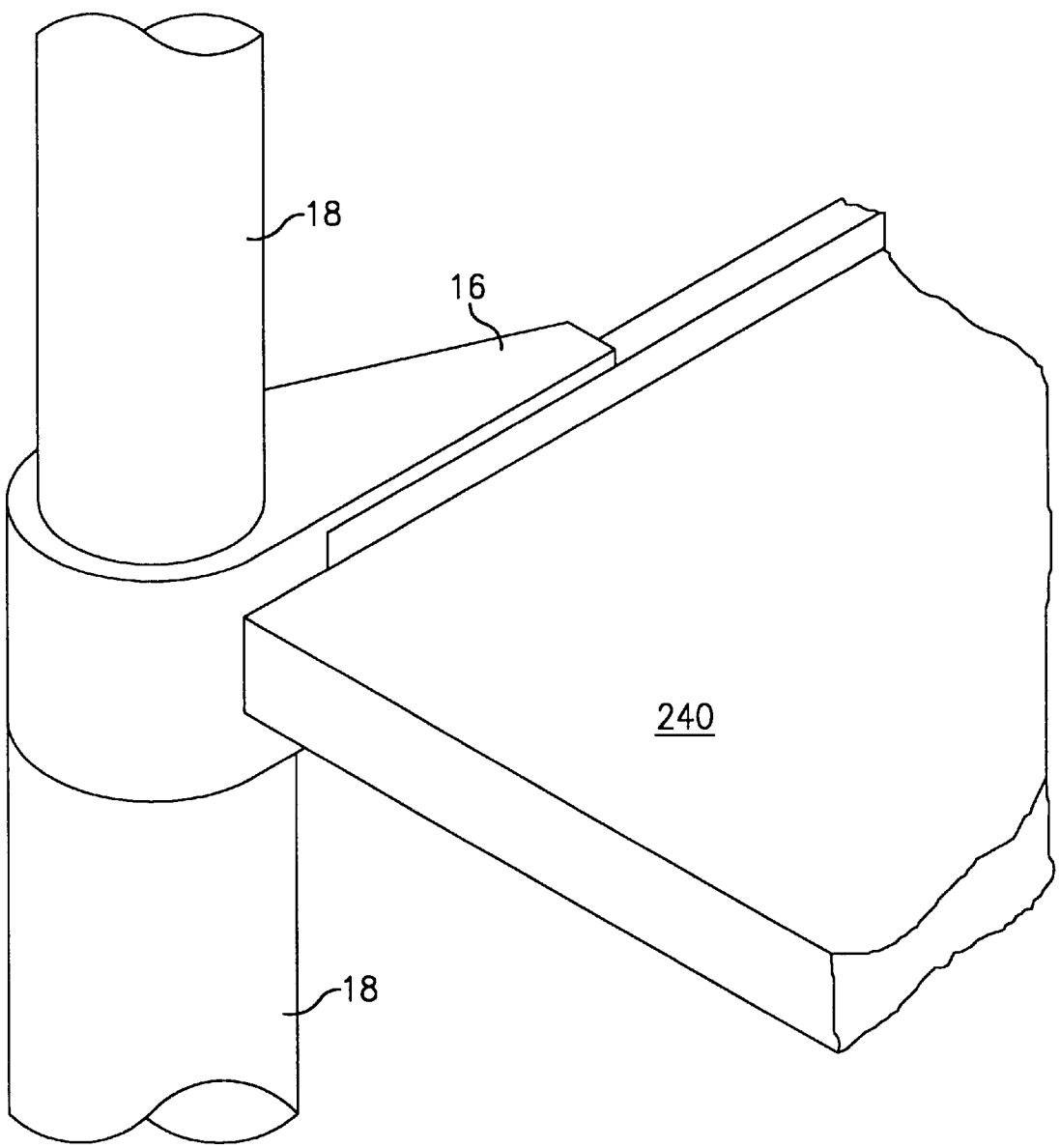
Figure 80B:
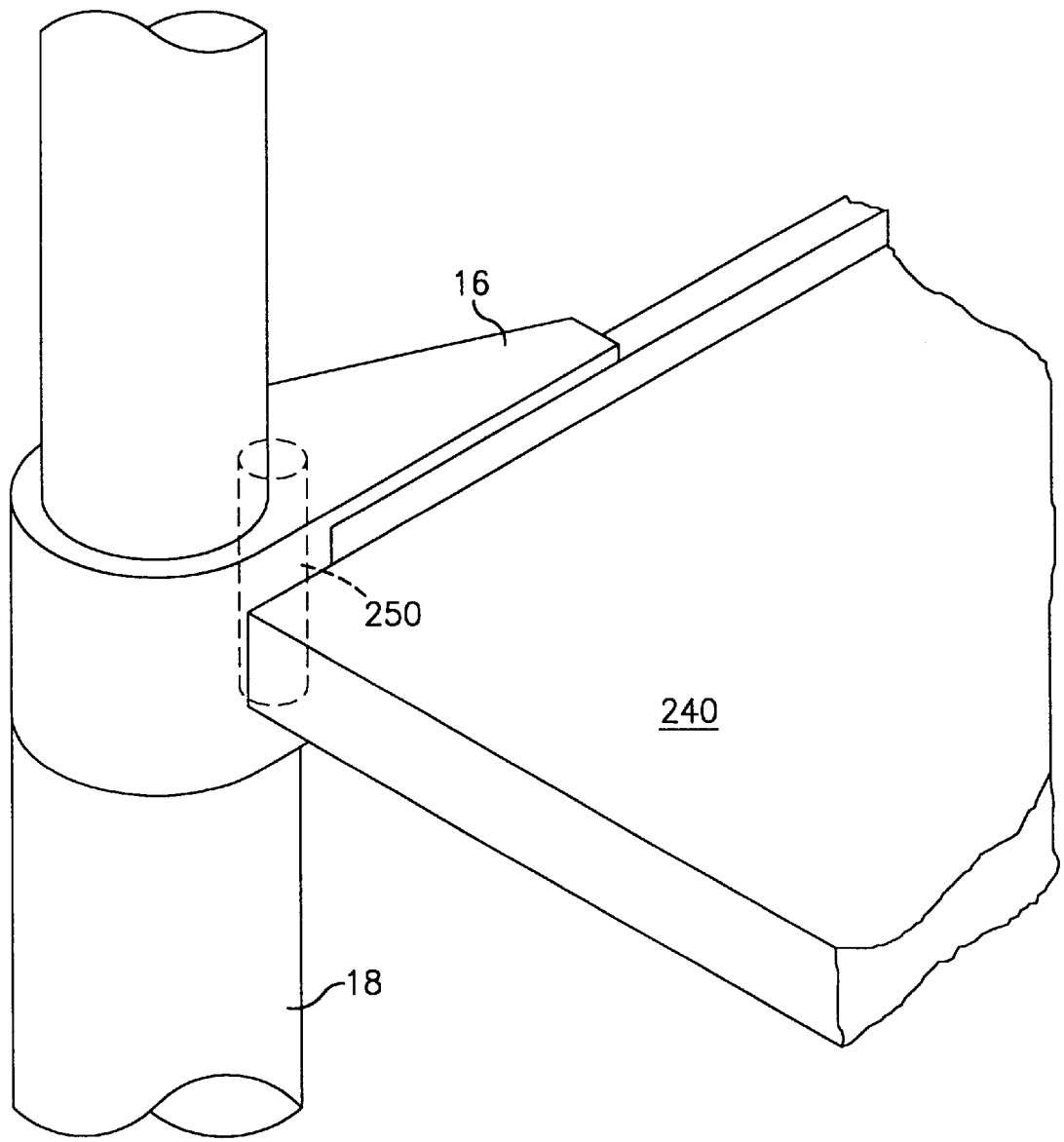

In FIGS. 80a and 80b, connecting elements 16 are shown in each case which are abutted in each case by tubes 18. At the lower part these are leg parts and at the upper part tubes 18 such as are shown in FIG. 7a. In contrast to design in accordance with the embodiment in accordance with FIG. 7a, a floor panel 240 is here inserted in each case into corresponding mounting slits of the connecting elements 16.

In FIG. 80b an eccentric 250 is shown as a broken line which is integrated in the holder and serves a simple mounting.

In principle, it should be pointed out that all front areas and sides, the holding level and the inserted floor panels of the relevant units are sealed to effectively prevent the penetration of damp, dirt, dust or even vermin into the kitchen cupboard inside.

The description of the individual embodiments of the furniture system in accordance with the invention makes clear that by means of a predetermined number of assemblies it is possible to put together kitchen furniture according to specific customer demands. By means of the furniture system, finished functional units can be put together which can be used in the form of "stand-alone" furniture.

What is claimed is:

1. A furniture system having a self-supporting basic framework with tubes or sections connected to each other by means of connecting elements, wherein
    the connecting elements each comprise a shaped part which is itself formed as a tube or substantially closed hollow section on which at least one laterally protruding projection is formed extending over the whole length of the connecting element,
    the connecting elements themselves are integrated as intermediate vertical components which replace part of and interconnect freely adjustably in height the tubes or sections to one another through opposite ends thereof in at least some parts in the basic framework, and
    horizontal tubes, sections, plates or frames of the basic framework are arranged to be mounted on the projection of the connecting element.

2. A furniture system in accordance with claim 1, wherein the connecting element possesses in cross-section the shape of an asymmetrical droplet or modified shape thereof.

3. A furniture system in accordance with claim 1, wherein the connecting element possesses a round or polygonal hollow section which is structured in each case to the shape of the tubes or sections to be connected to each other.

4. A furniture system in accordance with claim 1, wherein the connecting element possesses on one side of the projection a recess for the flush mounting of components.

5. A furniture system in accordance with claim 4, wherein the components are wall elements.

6. A furniture system in accordance with claim 1, wherein decorations are applied onto a surface of the projection from outside.

7. A furniture system in accordance with claim 6, wherein the decorations are engraved or printed on the surface of the projection.

8. A furniture system in accordance with claim 1, wherein assembly plates are arranged to be connected to the connecting element and which possess standardized boreholes, screw boreholes, recesses or grooves which serve for acceptance of components and fittings to be mounted.

9. A furniture system in accordance with claim 1, wherein the connecting element is formed in a plurality of parts.

10. A furniture system in accordance with claim 9, wherein the connecting element possesses overall a droplet shape, the connecting element including a screen which can be clamped on from the outside in order to hide screws of a screw connection.

11. A furniture system in accordance with claim 9, wherein the connecting element comprises a shaped recess extending over length of an outer surface of the tube or hollow section and said protruding projection comprises a corresponding shaped projection for insertion in the recess and the form-locking connection of the two parts.

12. A furniture system in accordance with claim 1, wherein the connecting elements possesses in cross-section the shape of a pennant-like projection.

13. A furniture system in accordance with claim 1, wherein the connecting elements and tubes or sections of the basic framework are structured and arranged to be connected to one another through a respective connecting element in a non-twist manner.

14. A furniture system in accordance with claim 1, wherein total length or height of a support formed by said intermediate connecting elements and tubes or sections extending through opposite ends thereof is adjustable without constraints on increments such that individual tubes or sections and individual intermediate connecting elements need not respectively be the exact same length and functional units of various sizes and shapes can be easily accommodated in the self-supporting basic framework which is self-reinforced with stability.

15. A furniture system in accordance with claim 1, wherein the furniture system is a kitchen furniture system.

16. A furniture system having a self-supporting basic framework with tubes or sections connected to each other by means of connecting elements, wherein the connecting elements each comprise a shaped part which is itself formed as a tube or substantially closed hollow section on which at least one laterally protruding projection is formed extending over the whole length of the connecting element, the connecting element themselves are integrated as intermediate vertical components which replace part of and connect the tubes or sections to one another through opposite ends thereof in at least some parts in the basic framework, horizontal tubes, sections, plates or frames of the basic framework are arranged to be mounted on the projection of the connecting element, and vertical elements of the basic framework forming the tubes or sections are arranged to extend into the hollow sections of the connecting elements through the opposite ends thereof.

17. A furniture system in accordance with claim 16, wherein the tubes or sections extending into the connecting element are arranged no to extend over the whole length of the connecting elements.

18. A furniture system in accordance with claim 17, wherein the connecting element possesses a round or polygonal hollow section which is structured in each case to the shape of the tubes or sections to be connected to each other.

19. A furniture system in accordance with claim 17, wherein the connecting element possesses on one side of the projection a recess for the flush mounting of components.

20. A furniture system in accordance with claim 17, wherein decorations are applied onto a surface of the projection from outside.

21. A furniture system in accordance with claim 17, wherein the connecting element is formed in a plurality of parts.

22. A furniture system in accordance with claim 16, wherein assembly plates are arranged to be connected to the connecting element and which possess standardized boreholes, screw boreholes recesses or grooves which serve for acceptance of components and fittings to be mounted.

23. A furniture system in accordance with claim 16, wherein the connecting elements interconnect freely adjustably in height, the tubes or sections to one another through the opposite ends thereof.

24. A furniture system in accordance with claim 16, wherein total length or height of a support formed by said intermediate connecting elements and tubes or sections extending through opposite ends thereof is adjustable without constraints on increments such that individual tubes or sections and individual intermediate connecting elements need not respectively be the exact same length and functional units of various sizes and shapes can be easily accommodated in the self-supporting basic framework which is self-reinforced with stability.

25. A furniture system in accordance with claim 16, wherein the furniture system is a kitchen furniture system.

* * * * *